United States Patent
Hagiwara

(10) Patent No.: US 7,889,260 B2
(45) Date of Patent: Feb. 15, 2011

(54) IMAGE SIGNAL PROCESSING CIRCUIT, IMAGE PICKUP APPARATUS AND IMAGE SIGNAL PROCESSING METHOD AS WELL AS COMPUTER PROGRAM

(75) Inventor: Shigeru Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/212,703

(22) Filed: Sep. 18, 2008

(65) Prior Publication Data

US 2009/0079859 A1 Mar. 26, 2009

(30) Foreign Application Priority Data

Sep. 21, 2007 (JP) ............................ P2007-244719

(51) Int. Cl.
H04N 3/14 (2006.01)
H04N 5/335 (2006.01)
(52) U.S. Cl. ...................................... 348/316; 348/324
(58) Field of Classification Search ................. 348/316, 348/324
See application file for complete search history.

(56) References Cited

U.S. PATENT DOCUMENTS

| | | | |
|---|---|---|---|
| 6,337,713 B1 * | 1/2002 | Sato ........................... | 348/311 |
| 6,791,615 B1 | 9/2004 | Shiomi et al. | |
| 7,236,199 B2 * | 6/2007 | Hori et al. .................... | 348/321 |
| 7,245,318 B2 * | 7/2007 | Shirakawa ............... | 348/218.1 |
| 7,277,128 B2 * | 10/2007 | Miyahara .................... | 348/249 |
| 7,295,238 B2 | 11/2007 | Tanaka et al. | |
| 7,379,104 B2 * | 5/2008 | Hattori et al. ............... | 348/241 |
| 7,508,435 B2 * | 3/2009 | Loew et al. ................. | 348/316 |
| 7,554,577 B2 * | 6/2009 | Yokohata et al. ......... | 348/222.1 |
| 2004/0257451 A1 * | 12/2004 | Yamamoto ............. | 348/207.99 |
| 2005/0007475 A1 * | 1/2005 | Hori et al. .................... | 348/321 |

FOREIGN PATENT DOCUMENTS

| | | |
|---|---|---|
| JP | 2001 94886 | 4/2001 |
| JP | 2002 142158 | 5/2002 |
| JP | 2002 252808 | 9/2002 |
| JP | 2003 143491 | 5/2003 |
| JP | 2004 64404 | 2/2004 |
| JP | 2004 336242 | 11/2004 |
| JP | 3619077 | 11/2004 |
| JP | 2004 350265 | 12/2004 |

* cited by examiner

*Primary Examiner*—Sinh Tran
*Assistant Examiner*—Hung H Lam
(74) *Attorney, Agent, or Firm*—Frommer Lawrence & Haug LLP; William S. Frommer

(57) ABSTRACT

An image signal processing circuit for executing signal processing for an output of an image pickup device, includes an image signal correction section; the image signal correction section including a calculation section, and a correction section.

12 Claims, 12 Drawing Sheets

F I G. 1
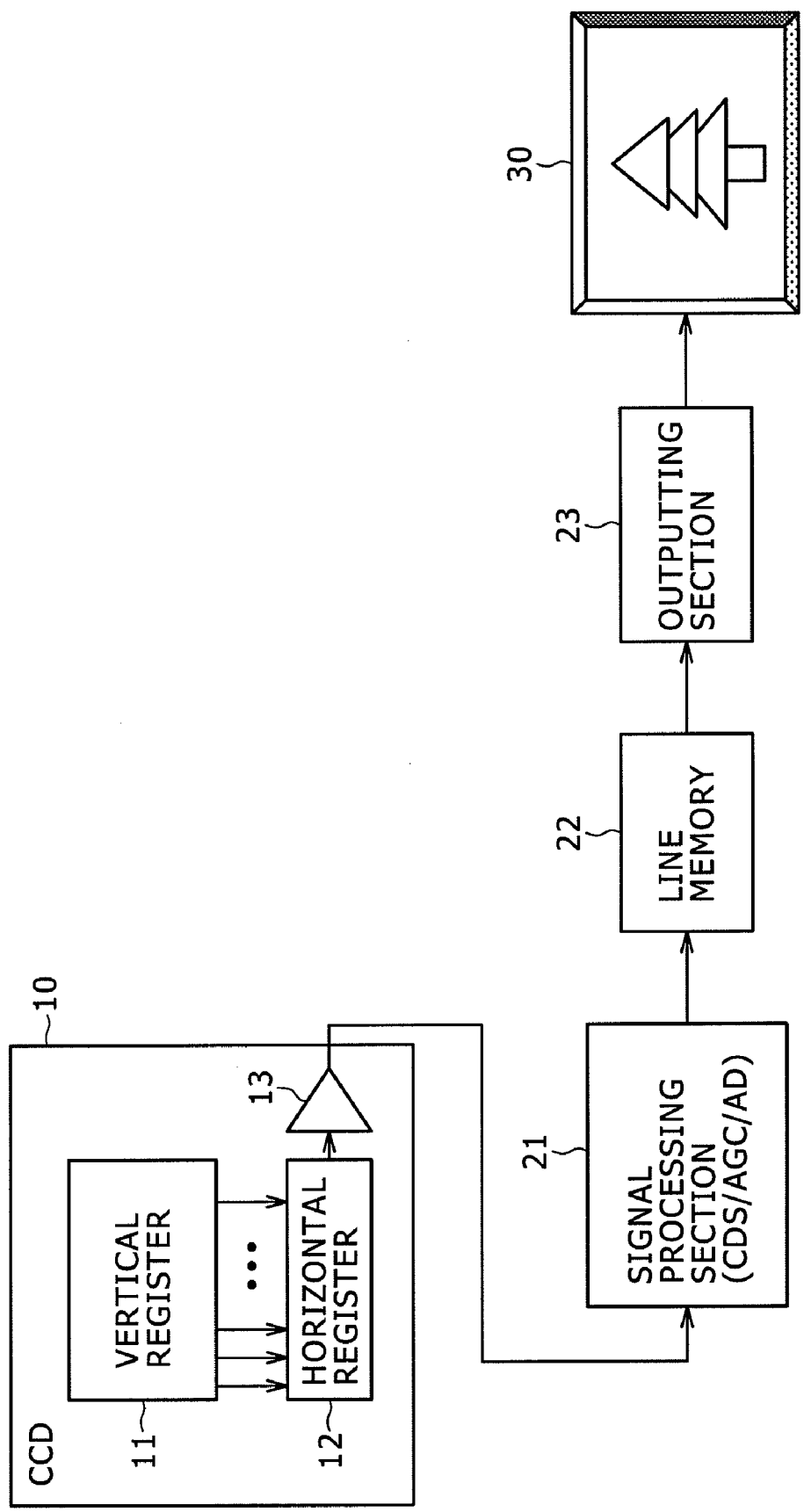

FIG.10

| R | G | R | G |
|---|---|---|---|
| G | B | G | B |
| R | G | R | G |
| G | B | G | B | ial
IMAGE SIGNAL PROCESSING CIRCUIT, IMAGE PICKUP APPARATUS AND IMAGE SIGNAL PROCESSING METHOD AS WELL AS COMPUTER PROGRAM

CROSS REFERENCES TO RELATED APPLICATIONS

The present invention contains subject matter related to Japanese Patent Application JP 2007-244719 filed with the Japan Patent Office on Sep. 21, 2007, the entire contents of which being incorporated herein by reference.

BACKGROUND OF THE INVENTION

1. Field of the Invention

This invention relates to an image signal processing circuit, an image pickup apparatus, an image signal processing method and a computer program, and more particularly to an image signal processing circuit, an image pickup apparatus, an image signal processing method and a computer program wherein an image pickup device has a plurality of divisional regions and signal processing is carried out individually for signals from the divisional regions.

2. Description of the Related Art

A CCD (Charge Coupled Device) unit, a CMOS (Complementary Metal Oxide Semiconductor) unit and so forth are generally used for an image pickup device for use, for example, with a video camera or a still camera. For example, an existing popular CCD unit receives light of pickup image information for one screen by means of a great number of photodetectors (PDs) thereof and reads out charge signals obtained by photo-electric conversion from the photodetectors through a vertical register and a horizontal register. Then, the CCD unit converts the read out charge signals into a data stream and outputs the resulting data stream from one output channel. Such a one-channel output type CCD unit and a signal processing configuration as just described are described below with reference to FIG. 1.

The CCD unit 10 shown includes a vertical register 11 for transferring charge accumulated in a plurality of photodetectors (PDs) as image pickup elements in a vertical direction, a horizontal register 12 for transferring the charge transferred by the vertical register 11 one by one line in a horizontal direction, and an output amplifier 13 for converting the charge of the horizontal register 12 into a voltage. The output of the output amplifier 13 is inputted to a signal processing section 21.

The signal processing section 21 includes a CDS circuit for executing removal of noise from within an input signal, an AGC circuit for carrying out gain adjustment, an AD conversion section for carrying out AD conversion, and so forth. A digital signal obtained by the signal processing of the signal processing section 21 is accumulated into a line memory 22 and then outputted through an outputting section 23. As a result, such an output image 30 as seen in FIG. 1 is obtained.

In recent years, because of a requirement for increase of the speed of signal processing or together with increase of the number of component pixels of a CCD unit, a configuration has been proposed which divides an output of a CCD unit into a plurality of outputs, carries out parallel processing of the outputs, multiplexes the thus processed outputs and outputs the resulting multiplexed output. High-speed signal processing is implemented by such a configuration as just described. For example, if signals of 2 channels are outputted, then signal processing of output data can be carried out using an frequency equal to one half that used where an output of one channel is used.

A CCD unit and a signal processing configuration ready for 2-channel outputs are described with reference to FIG. 2. The CCD unit 50 shown includes a vertical register 51 for transferring charge accumulated in photodetectors (PDs) in a vertical direction, and two horizontal registers 52 and 53 for transferring the charge transferred by the vertical register 51 one by one line in horizontal directions. The first horizontal register 52 receives outputs of those ones of the photodetectors which are included in a left half region in FIG. 2 while the second horizontal register 53 receives outputs those ones of the photodetectors which are included in a right half region in FIG. 2.

The accumulated data of the first horizontal register 52 are converted into voltages by an output amplifier 54 and inputted to a signal processing section 62. Meanwhile, the accumulated data of the second horizontal register 53 are converted into voltages by another output amplifier 55 and inputted to another signal processing section 61. The two signal processing sections 62 and 61 process the outputs of the component pixels in the left and right half regions in FIG. 2, respectively. High-speed processing is implemented by the parallel processing.

The data obtained by the signal processing of the signal processing sections 61 and 62 are inputted to line memories 63 and 64, respectively, multiplexed by a multiplexer 65 and then outputted through an outputting section 66. As a result, for example, such an output image 70 as shown in FIG. 2 is obtained.

According to the configuration shown in FIG. 2, the image pickup region of the CCD unit is divided into two left and right divisional regions, and data transfer and signal processing are executed parallelly for the horizontal registers 52 and 53 corresponding to the left and right divisional regions. Consequently, the output speed of the image is improved. However, since the plural output amplifiers 54 and 55 are used, a difference between output levels appears based on a difference in characteristic of the output amplifiers. In particular, where two outputs are derived from the CCD unit and amplified by the different output amplifiers 54 and 55 as seen in FIG. 2, a dispersion between the output data is caused by individual differences of the output amplifiers. Characteristics of the output amplifiers depend upon the fabrication process and the dispersion, and it is considerably difficult to make characteristic values of the amplifiers fully coincide with each other.

Further, while signals transmitted through the output amplifiers 54 and 55 are processed and converted into digital signals by the signal processing sections (CDS/AGC/AD blocks) 61 and 62, also it is very difficult to make characteristics of the CDS/AGC/AD functions fully coincide with each other. As a result, a difference appears between the output levels of the left and right images as seen from the output image 70 shown in FIG. 2.

In order to correct the levels of the left and right images to minimize the difference between the levels to make the boundary between the image pickup regions less conspicuous, the levels of the left and right image outputs should be made equal to each other. For example, a method of calculating and comparing output levels from the left and right regions with each other and correcting one of the output levels so as to coincide with the other output level is used. This method is disclosed, for example, in Japanese Patent No. 3,619,077 (hereinafter referred to as Patent Document 1). However, where the method disclosed in Patent Document 1 is applied, it is necessary to select, from within the divisional regions of the pixels, those regions which have a high correlation such as, for example, regions in which images of the same image pick object are picked up like regions in which images of the sky are picked up in the left and right image regions and carry out level comparison between the output levels of the select regions. Accordingly, it is necessary to carry out, as processing for level control, a decision process of the correlation, a selection process of regions having high correlation and so forth. Further, it is a problem that, where pixel regions having high correlation cannot be detected from within the divisional regions, the processing is disabled. It is to be noted that, while, in the description above, a CCD unit is used as an image pickup device, the situation is similar also where a CMOS (Complementary Metal Oxide Semiconductor) unit is applied as an image pickup device.

Japanese Patent Laid-Open No. 2002-252808 (hereinafter referred to as Patent Document 2) discloses an apparatus which averages, in order to correct the left and right output levels to minimize the level difference between the output levels, pixel data of the left and right channels over a plurality of lines to determine a difference between the pixel data and determine a gain correction value to carry out the correction. However, also the apparatus of Patent Document 2 requires a process which takes the correlation of the divisional regions into consideration and suffers from similar problems to those described above.

Japanese Patent Laid-Open No. 2003-143491 (hereinafter referred to as Patent Document 3) discloses an apparatus which includes a control system for controlling the outputs of the left and right channels independently of each other and adjusting the control system so as to minimize the level difference. However, where such an apparatus as just described is used, it is necessary to use the new control system, which gives rise to a problem of increase of the circuit scale and the cost.

Japanese Patent Laid-Open No. 2004-64404 (hereinafter referred to as Patent Document 4) discloses an image pickup apparatus which executes image pickup in a light blocking state, detects a level difference between the divisional regions based on the picked up image data to obtain data for level adjustment and carry out level adjustment for the picked up image data using the data for level adjustment. However, the image pickup apparatus of Patent Document 4 has a problem that it requires an acquisition process for control parameters prior to image pickup.

SUMMARY OF THE INVENTION

Therefore, it is desirable to provide an image signal processing circuit, an image pickup apparatus, an image signal processing method and a computer program by which output signals from an image pickup device such as a CCD unit or a CMOS unit from which a plurality of divisional outputs are derived can be corrected by a simple configuration to eliminate discontinuity on the boundary between divisional areas of the image pickup device.

According to an embodiment of the present invention, there is provided an image signal processing circuit for executing signal processing for an output of an image pickup device, including an image signal correction section configured to receive output signals corresponding to divisional regions of the image pickup device as inputs thereto and execute a correction process for the received signals. The image signal correction section includes a calculation section configured to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total. The image signal correction section further includes a correction section configured to execute comparison between the correction pixel value sum total difference calculated by the calculation section and a threshold value determined in advance, decide a correction mode for divisional region images in response to a result of the comparison and execute a pixel value correction process for the divisional region images in accordance with the decided correction mode. The calculation section carries out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

The image signal processing circuit may be configured such that the image signal correction section is configured to execute an image correction process for a monochromatic image, and acquires pixel values of a pixel column in each of the first and second image regions including, in each of the lines, one pixel adjacent the boundary between the first and second image regions individually corresponding to the divisional regions of the image pickup device. The image signal correction section executes a process of calculating the first pixel value sum total which is a sum value of pixel values of those of the pixels in the pixel column in the first image region each of which is adjacent the boundary in one of the lines and the correction second pixel value sum total which is a sum value of partly replaced pixel values of those of the pixels in the pixel column in the second image region each of which is positioned adjacent the boundary in one of the lines.

The image signal processing circuit may be configured such that the image signal correction section is configured to execute an image correction process for a color image, and acquires pixel values of a pixel column in each of the first and second image regions including, in each of the lines, one pixel adjacent the boundary between the first and second image regions individually corresponding to the divisional regions of the image pickup device. The image signal correction section executes a process of calculating the first pixel value sum total which is a sum value of pixel values of those of the pixels in the pixel columns in the first image region each of which is adjacent the boundary in one of the lines and the correction second pixel value sum total which is a sum value of partly replaced pixel values of those of the pixels in the pixel columns in the second image region each of which is positioned adjacent the boundary in one of the lines.

The image signal processing circuit may further include a plurality of output amplifiers configured to output voltage information based on charge information corresponding to the divisional regions of the image pickup device, a plurality of signal processing sections configured to individually receive the outputs of the output amplifiers as inputs thereto to produce digital signals, and a multiplexer configured to multiplex outputs of the signal processing sections. The calculation section receives the digital image signal from the multiplexer to execute calculation of the correction pixel value sum total difference, and the correction section receives the digital image signal from the multiplexer to execute the pixel value correction process.

Preferably, the image signal processing circuit is configured such that, where the absolute value of the correction pixel value sum total difference is higher than the preset threshold value, the correction section executes the pixel value correction process for changing the pixel value of the divisional region image, but, where the absolute value of the correction pixel value sum total difference is equal to or lower than the preset threshold value, the correction section does not execute the correction process.

The image signal processing circuit may be configured such that the correction section compares the correction pixel value sum total difference with the preset threshold value and selectively executes, in response to a result of the comparison, one of four operation patterns includes (1) an operation pattern wherein, where the correction pixel value sum total difference is equal to or greater than the threshold value, correction for raising the output level of the first image region is carried out. One of four operation patterns further includes (2) another operation pattern wherein, where the correction pixel value sum total difference is lower than the threshold value and is not a negative value, no correction is carried out, and (3) a further operation mode wherein, where the correction pixel value sum total difference is a negative value and the absolute value of the correction pixel value sum total difference is higher than the threshold value, correction for lowering the output level of the first image region. One of four operation patterns still further includes (4) a still further operation mode wherein, where the correction pixel value sum total difference is a negative value and the absolute value of the correction pixel value sum total difference is equal to or smaller than the threshold value, no correction is carried out.

Preferably, the image signal processing circuit is configured such that the correction section sets a correction amount having an absolute value smaller than an absolute value of the correction pixel value sum total difference to execute the correction process for each image frame.

According to another embodiment of the present invention, there is provided an image pickup apparatus including an image pickup section, and an image signal processing section configured to execute a signal process for an image signal from the image pickup section, the image pickup section having a configuration for outputting an output signal corresponding to each of divisional regions of an image pickup device, the image signal processing section including an image signal correction section configured to receive output signals corresponding to divisional regions of the image pickup device as inputs thereto and execute a correction process for the received signals. The image signal correction section includes a calculation section configured to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total. The image signal correction section further includes a correction section configured to execute comparison between the correction pixel value sum total difference calculated by the calculation section and a threshold value determined in advance, decide a correction mode for divisional region images in response to a result of the comparison and execute a pixel value correction process for the divisional region images in accordance with the decided correction mode. The calculation section carries out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

According to a further embodiment of the present invention, there is provided an image signal processing method executed by an image signal processing apparatus for executing signal processing for an output of an image pickup device, including an image signal correction step, executed by an image signal correction section of the image signal processing apparatus, of receiving output signals corresponding to divisional regions of the image pickup device as inputs to the image signal correction section and executing a correction process for the received signals. The image signal correction step includes a calculation step, executed by a calculation section of the image signal correction section, of acquiring pixel values of boundary pixels including pixels positioned adjacent the boundary between first and second image regions corresponding to the divisional regions of the image pickup device, calculating a first pixel value sum total which is a sum value of pixel values of the boundary pixels in the first image region on lines and a correction second pixel value sum total which is a sum value of partly replaced pixel values of the boundary pixels in the second image region on the lines and calculating a correction pixel value sum total difference which is a difference value between the first pixel value sum total and the correction second pixel value sum total. The image signal correction step further includes a correction step, executed by a correction section of the image signal correction section, of executing comparison between the correction pixel value sum total difference calculated by the calculation section and a threshold value determined in advance, deciding a correction mode for divisional region images in response to a result of the comparison and executing a pixel value correction process for the divisional region images in accordance with the decided correction mode. The calculation step is a step of carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

According to a still further embodiment of the present invention, there is provided a computer program for causing an image signal processing apparatus to execute signal processing for an output of an image pickup device, including an image signal correction step of causing an image signal correction section of the image signal processing apparatus to receive output signals corresponding to divisional regions of the image pickup device as inputs to the image signal correction section and execute a correction process for the received signals. The image signal correction step includes a calculation step of causing a calculation section of the image signal correction section to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total. The image signal correction step further includes a correction step of causing a correction section of the image signal correction section to execute comparison between the correction pixel value sum total difference calculated by the calculation section and a threshold value determined in advance, decide a correction mode for divisional region images in response to a result of the comparison and execute a pixel value correction process for the divisional region images in accordance with the decided correction mode. The calculation step is a step of carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

It is to be noted that the computer program of the present embodiment is a computer program which is provided in a computer-readable form, for example, to a general-purpose computer system which can execute various program codes and which can be provided by a storage medium and a communication medium. By providing such program in a computer-readable form, processes according to the program are implemented on the computer system.

With the image signal processing circuit, image pickup apparatus, image signal processing method and computer program, where output signals corresponding to divisional regions of an image pickup device are inputted to execute a correction process therefor, pixel values of boundary pixels including pixels in pixel columns positioned adjacent the boundary between first and second image regions corresponding to the divisional regions of the image pickup device and including at least one pixel for each of lines are acquired. Then, a first pixel value sum total which is a sum value of pixel values of the boundary pixels in the first image region on the lines is calculated. Further, if the difference between the pixel value of a pixel in the pixel column in the second image region on any of the lines and the pixel value of the corresponding pixel in the pixel column in the first image region on the same line is greater than a preset threshold value, then the pixel value of the pixel in the second image region is replaced with the pixel value of the pixel in the first image region. Then, a correction second pixel value sum total which is a sum value of the partially replaced pixel values, that is, the pixel values including those after such replacement, of the boundary pixels in the second image region on the lines is calculated. Thereafter, comparison of a correction pixel value sum total difference which is a difference value between the first pixel value sum total and the correction second pixel value sum total with a preset threshold value is executed. Then, a correction process for the divisional region images is executed in a correction mode which is determined in response to a result of the comparison. In particular, if the absolute value of the difference value is higher than the threshold value, then the process of changing the pixel values of the divisional region images is executed. With the configuration described, pixel value correction, that is, correction of eliminating discontinuity in the divisional image regions, can be carried out efficiently without executing such a process as correlation detection of the divisional regions.

The above features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a block diagram showing a CCD unit of the one-channel output type and an associated signal processing configuration;

FIG. 10 is a diagrammatic view illustrating a Bayer array; and

DETAILED DESCRIPTION OF THE PREFERRED EMBODIMENTS

In the following, details of an image signal processing circuit, an image pickup apparatus, an image signal processing method and a computer program according to the present embodiment are described with reference to the accompanying drawings. First, an example of a configuration of the image pickup apparatus and the image signal processing circuit according to an embodiment of the present invention is described with reference to FIG. 3.

Figure 2:
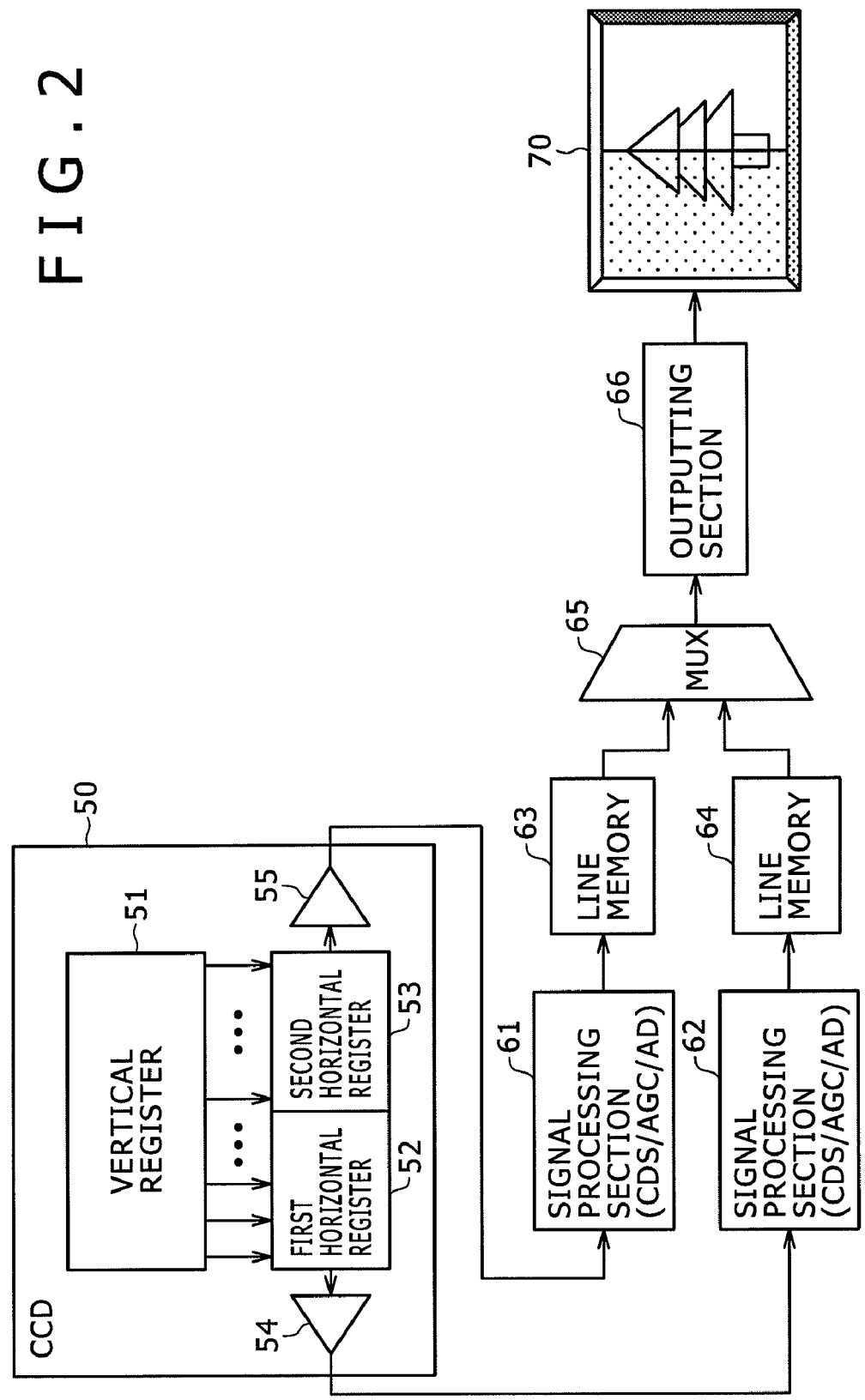
FIG. 2 is a block diagram showing a CCD unit of the two-channel output type and an associated signal processing configuration.

The image pickup apparatus shown in FIG. 3 includes a CCD unit 100 having an image pickup region divided into a plurality of divisional regions such that a plurality of outputs corresponding to the divisional regions are derived from the CCD unit 100 similarly to the CCD unit described hereinabove with reference to FIG. 2. A detailed configuration of the CCD unit 100 is described below with reference to FIG. 4. It is to be noted that, while the embodiment described below is directed to an example of a configuration which uses a CCD unit as an image pickup device, the present embodiment can be applied also to another configuration which uses not a CCD unit but a CMOS unit as an image pickup device.

Figure 4:
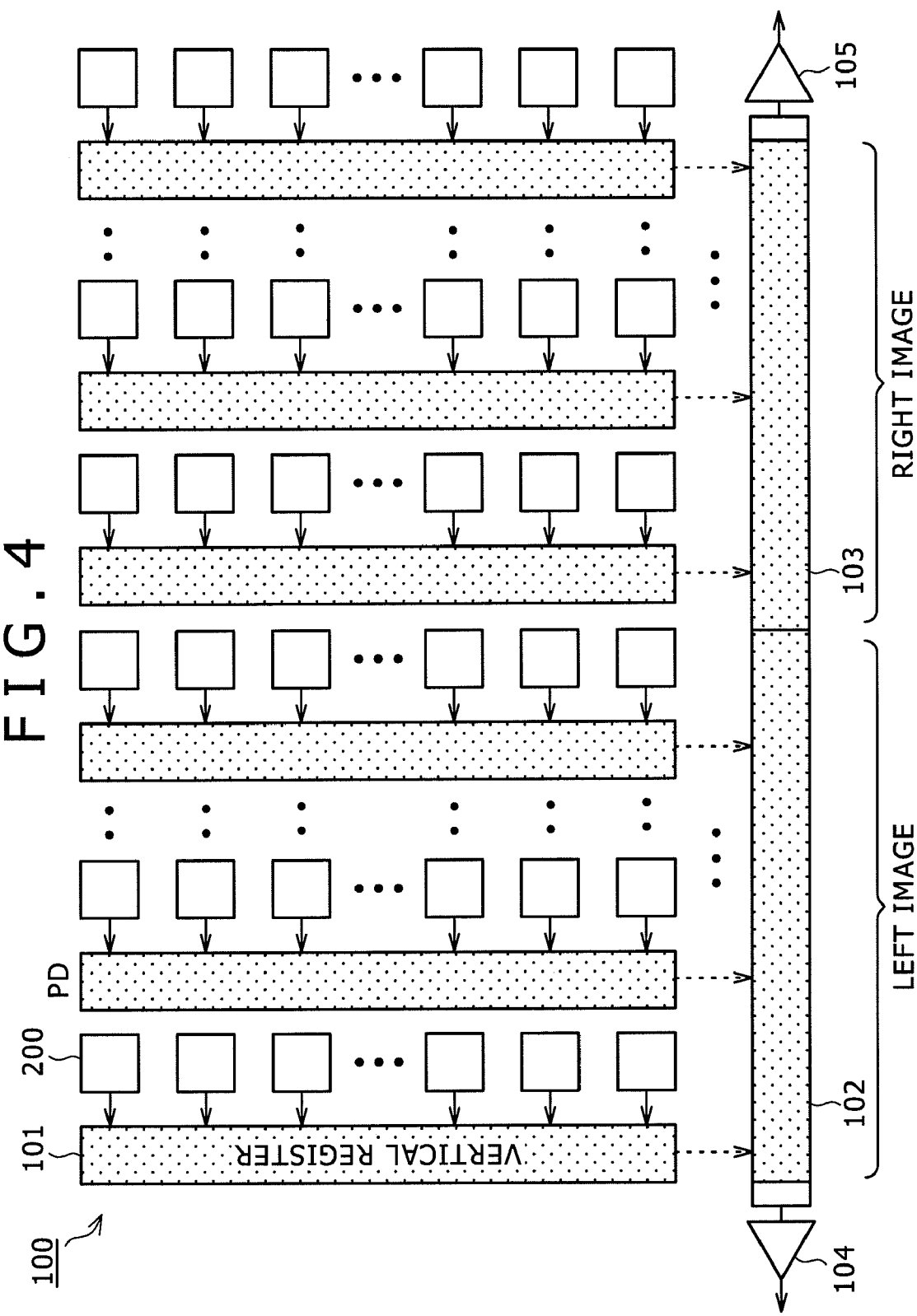
FIG. 4 is a block diagram showing a detailed configuration of a CCD unit employed in the image pickup apparatus of FIG. 3.

Referring to FIG. 4, the CCD unit 100 includes a large number of photodetectors (PDs) 200 as photoelectric conversion elements and outputs voltage signals based on charge accumulated in the photodetectors 200. The image pickup region for one screen of the CCD unit 100 is divided at the center in the horizontal direction into two divisional regions, and the CCD unit 100 outputs pixel information of different channels from the two divisional regions. The CCD unit 100 further includes a vertical register 101, and horizontal registers 102 and 103 for one line. The vertical register 101 is a register for transferring charge accumulated in the photodetectors 200 in a unit of one line in the vertical direction.

The horizontal registers 102 and 103 transfer charge for one line transferred thereto from the vertical register 101 in a unit of one pixel in the horizontal directions and input the charge information to output amplifiers 104 and 105 which convert the charge information into voltages and amplify the voltages. The output amplifiers 104 and 105 output the charge information corresponding to the divisional images as voltage signals. In this manner, the image information generated by the photodetectors (PDs) 200 of the CCD unit 100 is outputted from two output channels through the two output amplifiers 104 and 105.

In particular, the first horizontal register 102 outputs signals based on charge information outputted from the photodetectors PDs) 200 included in the region of the left image through the output amplifier 104. Meanwhile, the horizontal register 103 outputs signals based on charge information outputted from the photodetectors 200 included in the region of the right image through the output amplifier 105.

Referring back to FIG. 3, processing of the output signals of the output amplifiers 104 and 105 is described. The output of the output amplifier 104 which is image signal information corresponding to the left side image of the CCD unit 100 is inputted to a signal processing section 111. The signal processing section 111 includes a CDS circuit for executing removal of noise in the input signal, an AGC circuit for carrying out gain adjustment, an AD conversion section for carrying out AD conversion and so forth. The components of the signal processing section 111 carry out signal processing to produce digital signals of, for example, 12 bits (0 (min) to 4,095 (max)) from an analog signal. The digital signals are accumulated into a line memory 112.

Meanwhile, the output of the output amplifier 105 which is image signal information corresponding to the right side image of the CCD unit 100 is inputted to a signal processing circuit 113. Also the signal processing circuit 113 includes a CDS circuit for executing removal of noise in the input signal, an AGC circuit for carrying out gain adjustment, an AD conversion section for carrying out AD conversion and so forth. The components of the signal processing circuit 113 carry out signal processing to produce digital signals of, for example, 12 bits (0 (minute) to 4,095 (max)), and the digital signals are accumulated into a line memory 114.

The data accumulated in the line memory 112 correspond to image data of the left half of the CCD unit while the data accumulated in the line memory 114 correspond to image data of the right half of the CCD unit 100. The left side image stored in the line memory from within the image for one line stored in the line memories 112 and 114 are outputted in accordance with the first-in first-out (FIFO) method to a multiplexer (MUX) in accordance with an internal synchronizing signal. Meanwhile, the right side image stored in the line memory is outputted in accordance with the last-in first-out (LIFO) method such that the transfer start position and the transfer end portion are replaced with each other so that the transfer start position of the right side image region follows the transfer end position of the left side image region. In other words, the pixel transfer in the horizontal direction makes the left side image region and the right side image region continuous to each other in the output of the multiplexer (MUX) 115.

The output of the multiplexer 115 is inputted to a correction section 121 of an image signal correction section 120, by which pixel value correction is carried out. The correction process is described below with reference to FIG. 5.

Figure 5:
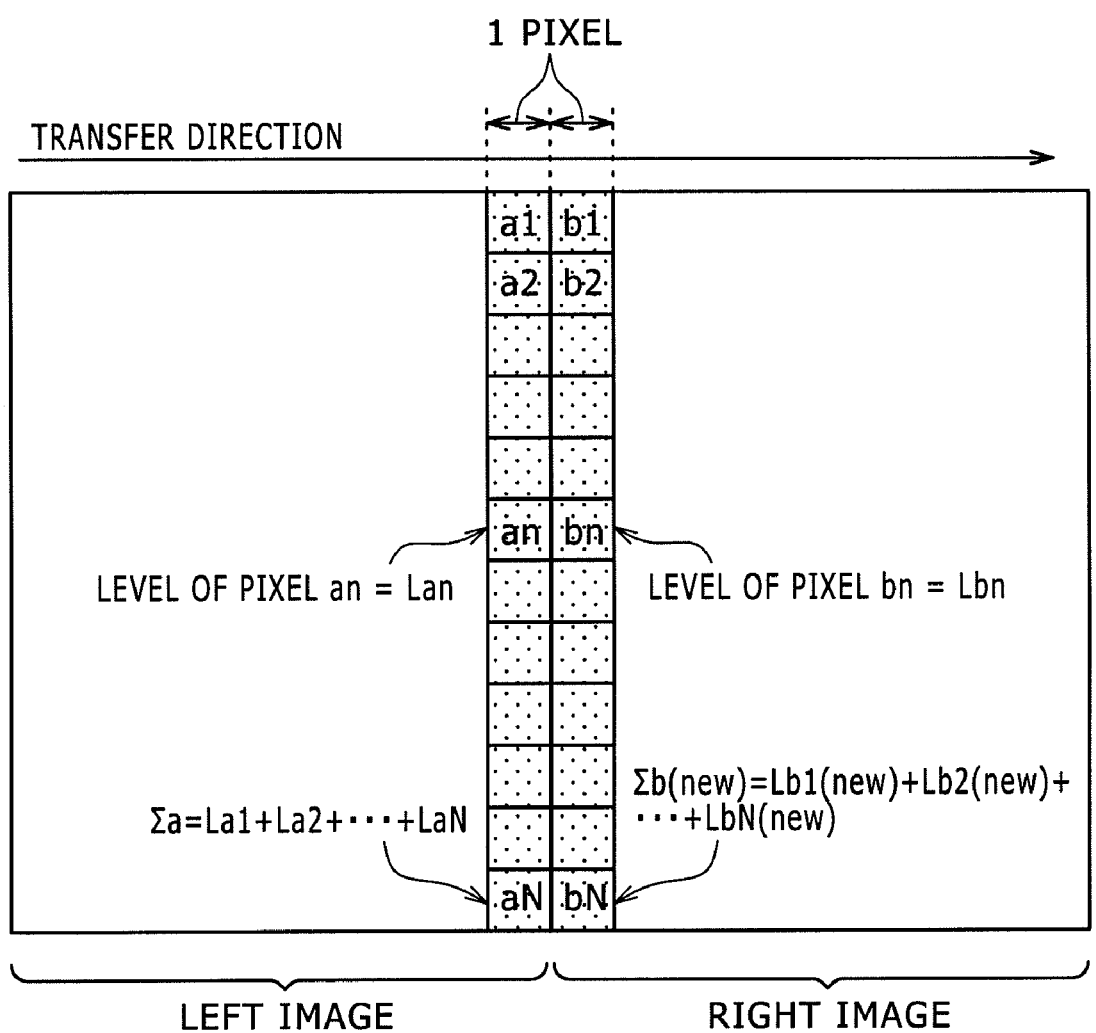
FIGS. 5 and 6 are diagrammatic views illustrating different examples of a correction process of an image to which the present embodiment is applied.

An image inputted to the correction section 121 is inputted also to a calculation section 122 through the correction section 121. The calculation section 122 includes an internal counter for counting the number of pixels and uses the internal counter to specify pixels a of the left image positioned adjacent the right side boundary of the left image and pixels b of the right image positioned adjacent the left side boundary of the left image. Then, the calculation section 122 determines pixel values in the boundary region. For example, as seen in FIG. 5, the pixel value of the pixel [a1] of the left image on the first line positioned adjacent the right side region is represented by [La1] and the pixel value of the pixel [b1] of the right image on the first line positioned adjacent the left side region is represented by [Lb1]. Similarly, the pixel values of the boundary pixels [a2] to [aN] and [b2] to [bN] which are pixels positioned adjacent the boundary between the left and right images on the second to Nth lines are represented respectively by

| | |
|---|---|
| [La2], | [Lb2] |
| [La3], | [Lb3] |
| . | |
| . | |
| . | |
| [LaN], | [LbN] |

If the CCD unit has a size of approximately 5,000,000 pixels, then it includes 2,448×2,050 pixels, and the value of N which corresponds to the number of effective lines is approximately 2,050 to 2,048.

The calculation section 122 calculates (a) the sum total of the pixel values [La1] to [LaN] of the pixels a1 to aN positioned adjacent the right side boundary of the left region image, and (b) the sum total of the pixel values [Lb1] to [LbN], which are partly replaced (that is, some of which is or are replaced), by a process hereinafter described, of the pixels b1 to bN positioned adjacent the left side boundary of the right region image.

In other words, the calculation section 122 calculates the pixel value sum totals including (a) the pixel value sum total of the pixels a1 to aN: Σa=La1+La2+ . . . LaN, and (b) the correction pixel value sum total of partly replaced pixel values of the pixels b1 to bN: Σb(new)=Lb1(new)+Lb2(new)+ . . . +LbN(new)

Now, a calculation process of the correction pixel values [Lb1(new)] to [LbN(new)] by replacement of the pixel values [Lb1] to [LbN] of the pixels b1 to bN positioned adjacent the left side boundary of the right region image is described.

The calculation section 122 calculates a difference absolute value [LSUBn] of the pixel value [Lan] of the pixel [an] positioned adjacent the image boundary of the left image and the pixel value [Lbn] of the pixel [bn] of the image boundary of the right image for each of the N lines from the first line to the Nth line in accordance with the following expression:

$$LSUBn = |Lbn - Lan|$$

The calculation is carried out for all of the first to Nth lines. Here, n=1 to N.

Then, the calculation section 122 compares the difference absolute value [LSUBn] calculated for each of the first to Nth lines with a difference threshold value [DIFF] set in advance.

If the difference absolute value [LSUBn] is higher than the difference threshold value [DIFF], then the calculation section 122 decides that the correlation of the pixel [an] and the pixel [bn] of the left and right images which are contiguous to each other on the boundary is low.

This is a decision that the pixel [an] and the pixel [bn] of the left and right images which are contiguous to each other on the boundary correspond to a case wherein, for example, different objects are displayed, that is, the boundary between the images incidentally corresponds to the boundary between different objects.

Figure 6:
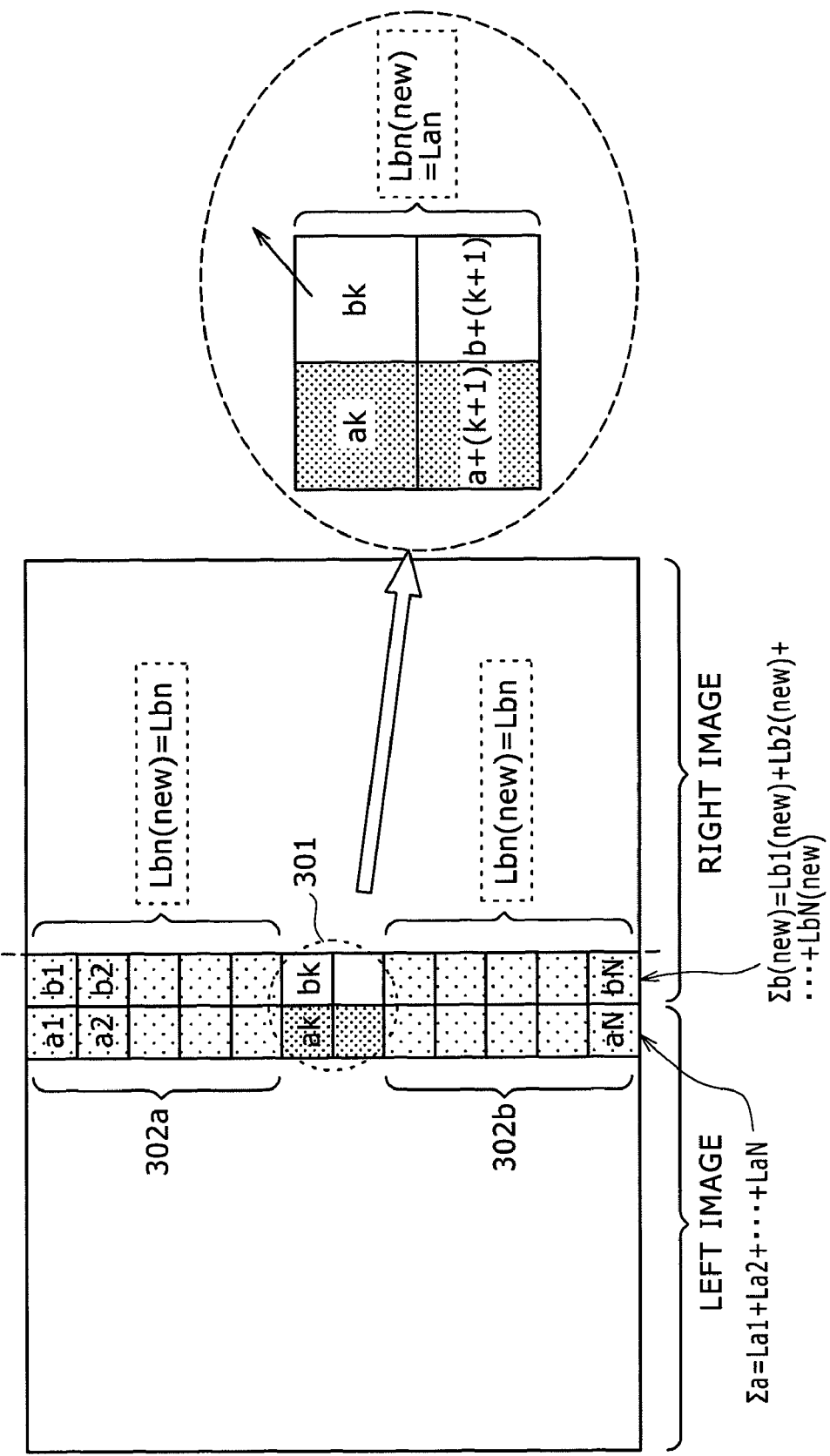

In particular, if, for example, the pixel [an] of the left image and the pixel [bn] of the right image are compared with each other like pixels included in a pixel region 301 shown in FIG. 6, the pixel value [Lan] of the pixel [an] is apparently higher than the pixel value [Lbn] of the pixel [bn] and the correlation is considerably low. If, although pixels which have apparently different pixel levels in this manner are positioned on the boundary, such pixels are corrected so as to have the same level for balance adjustment of the left and right images, then this corrects the pixel values in error.

In an image correction process according to the image signal processing method of the present embodiment, balance adjustment is carried out taking the presence of such pixels which have low correlation into consideration. In particular, if the difference absolute value [LSUBn] between the pixel value [Lan] of the pixel [an] on the image boundary of the left image and the pixel value [Lbn] of the pixel [bn] on the image boundary of the right image is higher than the difference threshold value [DIFF] set in advance, then it is decided that the correlation between the pixel [an] and the pixel [bn] of the left and right images which are contiguous to each other on the boundary is low, and it is carried out to set the correction pixel value [Lbn(new)] as [Lan]. Thereafter, the correction pixel value sum total: Σb(new)=Lb1(new)+Lb2(new)+ . . . +LbN(new) to be used upon balance adjustment between the left and right images is calculated.

In particular, if the difference absolute value [LSUBn] of the pixel value [Lan] of the pixel [an] on the image boundary of the left image and the pixel value [Lbn] of the pixel [bn] on the image boundary of the right image is higher than the preset difference threshold value [DIFF] like the pixels [an] and [bn] which belong to the pixel region 301 as seen in FIG. 6, that is, if the following expression LSUBn>DIFF is satisfied, then the pixel value [Lbn] of the pixel [bn] is replaced with the pixel value [Lan] of the pixel [an] of the left image on the same line. In other words, the correction pixel value [Lbn(new)] is set to $$[Lbn(\text{new})] = [Lan]$$

In the example illustrated in FIG. 6, the pixel value replacement process described above is carried out for the pixel [bk] and the pixel [bk+1] included in the pixel region 301.

On the other hand, if the expression

LSUBn>DIFF is not satisfied, then it is decided that the correlation between the pixel [an] and the pixel [bn] of the left and right images which are contiguous to each other on the boundary has high correlation. In particular, it is decided that this corresponds to a case wherein, for example, the same object is displayed by the pixel [an] and the pixel [bn] of the left and right images which are contiguous to each other on the boundary, and the pixel [an] and the pixel [bn] of the left and right images have substantially equal pixel values and have high correlation. In the example of FIG. 6, the expression LSUBn>DIFF is not satisfied in pixel regions 302a and 302b of the boundary pixels other than the pixel region 301, and it is decided that the correlation between the pixel [an] and the pixel [bn] of the left and right images which are contiguous to each other on the boundary is high.

In this instance, the level [Lbn] itself of the pixel [bn] is adopted as the correction pixel value [Lbn(new)]. In other words, the correction pixel value [Lbn(new)] is set to $$[Lbn(\text{new})] = [Lbn]$$

In this manner, the process described above is executed successively for the pixel levels [Lan] of the boundary pixels [an] of the left image and the pixel levels [Lbn] of the boundary pixels [bn] of the right image on the first to Nth lines. In particular, $$LSUBn = |Lbn - Lan|$$

is calculated for each of the first to Nth lines, and then it is decided whether or not the expression LSUBn>DIFF is satisfied.

Then, if the expression LSUBn>DIFF is satisfied, then the correction pixel value [Lbn(new)] is set to [LBn(new)]=[Lan] but, if the expression LSUBn>DIFF is not satisfied, that is, in case of LSUBn≦DIFF, the correction pixel value [Lbn(new)]=[Lbn] is set to [Lbn(new)]=[Lbn].

Based on the results of the process described above, correction pixel values [Lb1(new)] to [LbN(new)] of all of the boundary pixels [bn] of the right image on the first to Nth lines are calculated. Then, the correction pixel value sum total of the pixels b1 to bN: Σb(new)=Lb1(new)+Lb2(new)+ . . . + LbN(new) is calculated.

In other words, the calculation section 122 calculates the two pixel value sums including:

(a) the pixel value sum total of the pixels a1 to aN: Σa=La1+ La2+ . . . . Lan, and (b) the correction pixel value sum total of partly replaced pixel values of the pixels b1 to bN: Σb(new)=Lb1(new)+Lb2 (new)+ . . . +LbN(new)

It is to be noted that the preset difference threshold value [DIFF] can be set, for example, from an external personal computer (PC) as a control information setting section 123. For example, where the pixel values of the pixels can be set among pixel value levels from 0 to 4,095 using 12 bits, the difference threshold value [DIFF] can be set to one of the values from 0 to 4,095. As a particular example, where the pixel values of the pixels can be set among pixel value levels from 0 to 4,095 using 12 bits, the difference threshold value [DIFF] is set, for example, to [DIFF]=128.

Now, a calculation process sequence of the correction pixel value sum total of partly replaced pixel values of the pixels b1 to bN: Σb(new)=Lb1(new)+Lb2(new)+ . . . +LbN(new) is described. This process is executed by the calculation section 122 in the image signal correction section 120.

First, as initialization, the correction pixel value sum total Σb(new) is set to Σb(new)=0 at step S101 and the parameter

[n] as line designation information is set to n=1 at step S102. Here, n is a variable which is successively set, where the total line number is N, within the range from 1 to N. As a result of the setting of the parameter [n] to n=1, processes at steps beginning with step S103 are executed first for the top line.

At step S103, a comparison process is executed between the pixel value [Lan] of the pixel [an] on the left image and the pixel value [Lbn] of the pixel [bn] of the right image.

If the expression

Lbn>Lan is satisfied, then the processing advances to step S104, at which a calculation process of the difference absolute value [LSUBn] between the pixel value [Lan] of the pixel [an] of the left image and the pixel value [Lbn] of the pixel [bn] of the right image is carried out in accordance with the following expression:

$LSUBn=Lbn-Lba$

On the other hand, if the expression

Lbn>Lan is not satisfied at step S103, then the processing advances to step S105, at which a calculation process of the difference absolute value [LSUBn] of the pixel value [Lan] of the pixel [an] of the left image and the pixel value [Lbn] of the pixel [bn] of the right image is carried out in accordance with the following expression:

$LSUBn=Lan-Lbn$

Then at step S106, the difference absolute value [LSUBn] of the pixel value [Lan] of the pixel [an] of the left image and the pixel value [Lbn] of the pixel [bn] of the right image and the preset difference threshold value [DIFF] are compared with each other. In other words, it is decided whether or not the following expression LSUBn>DIFF is satisfied.

If it is decided that

LSUBn>DIFF is satisfied, then the processing advances to step S107, at which the pixel value [Lbn] of the pixel [bn] is replaced with the pixel value [Lan] of the pixel [an] of the left image on the same line and updates the correction pixel value sum total [Σb(new)] to correction pixel value sum total: $\Sigma b(new)=\Sigma b(new)+Lan$ On the other hand, if the expression LSUBn>DIFF is not satisfied, then the processing advances to step S108, at which the pixel value [Lbn] of the pixel [bn] is applied as it is to update the correction pixel value sub total [Σb(new)] to correction pixel value sum total: $\Sigma b(new)=\Sigma b(new)+Lbn$ Thereafter, the processing advances to step S109, at which it is decided whether or not the pixel line designating variable [n] reaches the lowermost line [N]. If the pixel line designating variable [n] does not reach the lowermost line [N], then the processing advances to step S110, at which the parameter n is updated to n=n+1 so that the processes at the steps beginning with step S103 are executed for the next line.

If the processing for all of the lines 1 to N is completed by the processes described above, then the calculation of the correction pixel value sum total of partly replaced pixel values of the pixels b1 to bN: $\Sigma b(new)=Lb1(new)+Lb2(new)+\ldots+LbN(new)$ is completed. It is to be noted that, while the flow illustrated in FIG. 7 indicates only the calculation process sequence for the correction pixel value sum total Σb(new), in addition to the process described, the calculation section 122 calculates also the pixel value sum total of the boundary pixels [an] of the left image, that is, the correction pixel value sum total of the pixels a1 to aN:

$\Sigma a=La1+La2+\ldots+LaN.$

In short, the calculation section 122 calculates the two pixel value sum totals including (a) the pixel value sum total of the pixels a1 to aN: $\Sigma a=La1+La2+\ldots LaN$, and (b) the correction pixel value sum total of partly replaced pixel values of the pixels b1 to bN: $\Sigma b(new)=Lb1(new)+Lb2(new)+\ldots+LbN(new)$ and outputs the calculated sum total values to the correction section 121. The correction section 121 thus executes a balance adjustment process of the left and right images based on the input data, that is, image correction for reducing the discontinuity between the left and right image regions.

It is to be noted that, while, in the present example of the process, the pixel value [Lan] is utilized for all of the boundary pixels [an] of the left image to calculate the pixel value sum total [Σa] while, for the boundary pixels [bn] of the right image, the correction pixel value sum total [Σb] is carried out, the processes for the left image and the right image may be exchanged for each other. In particular, for the boundary pixels [bn] of the right image, the pixel values [Lbn] may be utilized to calculate the pixel value sum total [Σb] while, for the boundary pixels [an] of the left image, the correction pixel value sum total [Σa] is calculated.

Now, processing of the correction section 121 is described. The correction section 121 executes image correction for reducing the discontinuity between the left and right image regions. In the image process of the image signal processing method of the present embodiment, as a process for reducing the discontinuity between the left and right image regions, the following processes are carried out. In particular, correction for minimizing the correction pixel value sum total difference [SUB(new)] represented by $SUB(new)=\Sigma b(new)-\Sigma a$ that is, a difference between the two pixel value sum totals calculated by the processes described above, including (a) the pixel value sum total of the pixels a1 to aN: $\Sigma a=La1+La2+\ldots LaN$, and (b) the correction pixel value sum total of partly replaced pixel values of the pixels b1 to bN: $\Sigma b(new)=Lb1(new)+Lb2(new)+\ldots+LbN(new)$ is carried out. The correction section 121 carries out, based on the correction pixel value sum total difference [SUB(new)] calculated based on image data of a certain one image, processing for the image frame.

It is to be noted that the processing may be carried out by any of two processing modes including (1) a processing mode wherein the correction pixel value sum total difference [SUB(new)] is calculated in a unit of a frame and image correction based on the calculated data is carried out in a unit of a frame, and (2) another processing mode wherein one frame image is utilized to calculate the correction pixel value sum total difference [SUB(new)] and image correction based on the calculated data is carried out for the frame and a plurality of succeeding frames.

The image correction process executed by the correction section 121 is described below. The correction section 121 compares the correction pixel value sum total difference [SUB(new)=Σb(new)−Σa] with a threshold value [Th] set in advance and selectively executes one of the following processes in response to a result of the comparison. In particular, (1) where the correction pixel value sum total difference [SUB(new)=Σb(new)−Σa] is equal to or greater than the threshold value [Th], correction of adding an offset amount to the left region image (plus correction) is carried out in order to raise the output level of the left region image;

(2) where the correction pixel value sum total difference [SUB(new)=Σb(new)−Σa] is lower than the threshold value [Th] and is not a negative value, no correction is carried out;

(3) where the correction pixel value sum total difference [SUB(new)=Σb(new)−Σa] is a negative value and the absolute value |SUB (new)| of the correction pixel value sum total difference [SUB(new)] is higher than the threshold value [Th], correction of subtracting an offset amount from the left region image (minus correction) is carried out in order to lower the output level of the left region image; or (4) where the correction pixel value sum total difference [SUB(new)=Σb(new)−Σa] is a negative value and the absolute value |SUB (new)| of the correction pixel value sum total difference [SUB(new)] is equal to or smaller than the threshold value [Th], no correction is carried out.

In short, one of the four patterns (1) to (4) described is carried out based on a result of the comparison between the correction pixel value sum total difference [SUB(new)=Σb(new)−Σa] and the preset threshold value [Th].

It is to be noted that the threshold value [Th] and the correction mode information (1) to (4) described above can be inputted from the control information setting section 123 such as, for example, a PC. Further, a memory for storing the threshold value [Th] and the correction mode information (1) to (4) may be set in the correction section 121 such that the recoded information is applied. The correction mode information includes a correction amount or offset amount.

Among the correction processes (1) to (4) described above, a correction process is actually carried out for an image in the correction processes (1) and (3). In particular, (1) where the correction pixel value sum total difference [SUB(new)=Σb(new)−Σa] is equal to or greater than the threshold value [Th], correction of adding an offset amount to the left region image (plus correction) is carried out in order to raise the output level of the left region image; but (3) where the correction pixel value sum total difference [SUB(new)=Σb(new)−Σa] is a negative value and the absolute value |SUB(new)| of the correction pixel value sum total difference [SUB(new)] is higher than the threshold value [Th], correction of subtracting an offset amount from the left region image (minus correction) is carried out in order to lower the output level of the left region image.

Here, the offset amount is a correction amount for raising or lowering the output level and corresponds, for example, to a shift amount of the luminance level. The offset amount is determined with reference to a fixed amount of approximately 0.1% when compared with a maximum value in quantization. For example, where the luminance level is a 12-bit digital signal (0 (min) to 4,095 (max)), the offset amount is set to $$4,095 \times 0.1\% = 4$$

and consequently, level adjustment for pixels of one image is carried out within the range from −4 to +4 in the luminance level. Thus, the correction section 121 sets a correction amount having an absolute value lower than an absolute value of the difference value and successively executes a correction process for the image frame using the set correction amount.

For example, where the luminance level is a 12-bit digital signal (0 (min) to 4,095 (max)), (1) where the correction pixel value sum total difference [SUB(new)=Σb(new)−Σa] is equal to or greater than the threshold value [Th], correction of adding [+4] to the luminance level of the left region image [plus correction] is carried out in order to raise the output level of the left region image; but (3) where the correction pixel value sum total difference [SUB(new)=Σb(new)−Σa] is a negative value and the absolute value |SUB(new)| of the correction pixel value sum total difference [SUB(new)] is higher than the threshold value [Th], correction of adding [−4] to the luminance level the left region image [minus correction] is carried out in order to lower the output level of the left region image.

The reason why the correction pixel value sum total difference [SUB(new)=Σb(new)−Σa] is not applied as it is as the correction amount or offset amount is that it is intended to suppress an oscillation phenomenon by correction. The oscillation phenomenon by correction is a phenomenon that, if correction by a great amount is carried out, then an image signal obtained successively by image pickup undergoes plus correction and minus correction by every image pickup operation thereby to repeat plus correction and minus correction permanently and the image in the region for which the correction is carried out repeats bright display and dark display. Such an oscillation phenomenon as just described occurs particularly in such a case that the correlation between the left and right regions of an image at a current point of time is much different from the correlation between the left and right regions of an image at a next point of time.

In the present embodiment, in order to avoid such an oscillation phenomenon as described above, the correction amount is set to approximately 0.1% of a maximum value of the quantization level and, every time image pickup is carried out, correction is applied moderately to an image picked up subsequently. Oscillation is suppressed by carrying out such a correction process as just described. As described above, the threshold value and the correction amount or offset amount may be inputted from the control information setting section 123 to the correction section 121 shown in FIG. 3 or may be stored in and read out from a memory of the correction section 121.

The signal processing method of the present embodiment described above is ready for a high frame rate system wherein an unnecessary image pickup region is transferred at a high speed and an outputted image region is transferred at an ordinary rate. Where processing is carried out in accordance with the high frame rate system, although the number of lines to be added differs depending upon setting of the high frame rate, it is possible to carry out setting of a threshold value and setting of a correction amount in response to the high frame rate setting, and stable control can be carried out by such setting. It is to be noted that many CCD units have a dispersion in sensitivity for every component pixel, and also pixels which are positioned adjacent each other on the boundary between divisional regions have a dispersion in sensitivity.

However, in the configuration of the present embodiment, for example, as described hereinabove with reference to FIGS. 5 and 6, the correction pixel value sum total difference [SUB(new)=Σb(new)−Σa] of a pixel column in the vertical direction on the boundary between the divisional image regions is calculated, and a correction mode is determined from among the correction modes (1) to (4) described hereinabove based on the calculated difference to execute the correction. Therefore, the correction is less likely to be influenced by the sensitivity dispersion of the individual pixels, and the difference occurrence factor in calculation of the correction pixel value sum total difference [SUB(new)=Σb(new)−Σa] is likely to depend only on the characteristic of output amplifiers and signal processing sections for the left and right regions.

Figure 8A:
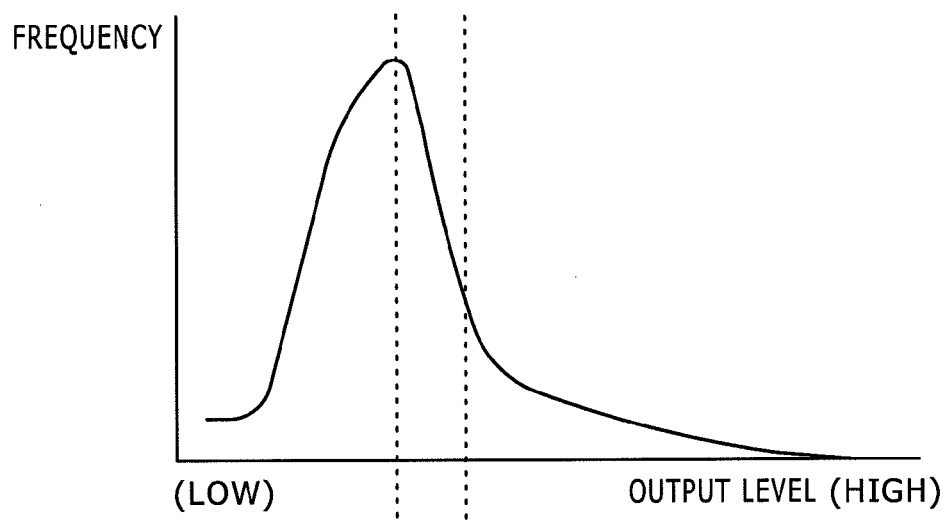
FIGS. 8A and 8B are diagrams illustrating a merit where a correction mode is determined by applying a difference between pixel value sum totals of pixels of one line.
Figure 8B:
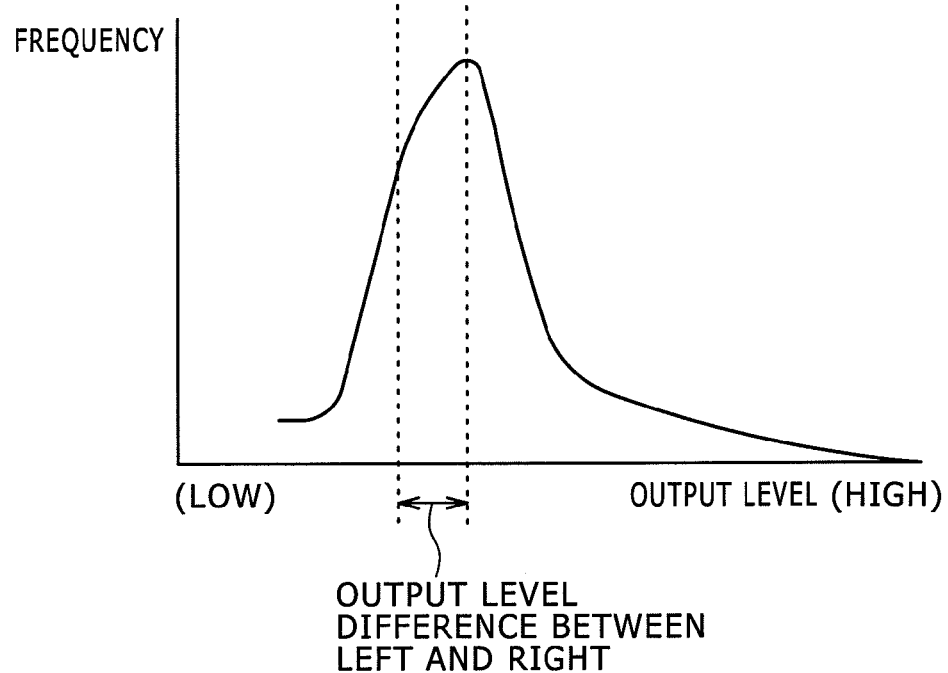

In particular, where the correction pixel value sum total difference [SUB(new)=Σb(new)−Σa] of pixels of one line is applied to determine a correction mode, the correction is less likely to be influenced by the sensitivity dispersion of the individual pixels. This merit is described with reference to FIGS. 8A and 8B. FIGS. 8A and 8B show histograms as frequency distributions of the output level of pixels of one column on the boundary between divisional image regions, and particularly, FIGS. 8A and 8B show histograms for the left side region and the right side region, respectively. If comparison is carried out otherwise in a unit of a pixel, then a difference in dispersion only between two different pixels is detected, and this dispersion provides a great difference. However, where a difference between sum totals of pixel values of large numbers of pixels in the vertical direction are compared with each other, the influence which the individual pixels have on the difference becomes relatively small. As a result, although the distributions of the image level have similar shapes to each other, they exhibit different peak positions as seen from FIGS. 8A and 8B. The difference between the peak positions is the difference in level, for example, in luminance between the left image and the right image, and the factor of occurrence of the difference depends upon the characteristics of the output amplifiers and the signal processing sections for the left and right regions.

Where a CCD unit has a great number of pixels such as several million pixels, two pixels adjacent each other in an image pickup region pick up the same base of the same image pickup object with a high probability. Therefore, the difference in distribution described above originates not from a difference between image pickup objects but from a difference between two processing systems for signal information corresponding to two divisional images, that is, the two processing systems including (a) the output amplifier 104 and the signal processing section 111, and (b) the output amplifier 105 and the signal processing section 113 shown in FIG. 3.

The image data corrected by the correction section 121 are outputted to an outputting section 130, from which correcting image data 150 are outputted. In this manner, the image signal correction section 120 of the image pickup apparatus is configured such that the calculation section 122 calculates the correction pixel value sum total difference [SUB(new)=Σb(new)−Σa] of the pixel column in the vertical direction positioned on the boundary of the divisional image regions, and the correction section 121 selectively determines one of the correction modes (1) to (4) described above based on the calculated correction pixel value sum total difference [SUB(new)=Σb(new)−Σa] to execute the correction. Therefore, it is possible to minimize the influence of the sensitivity dispersion of the individual pixels to correct the level difference which arises only from the characteristics of the output amplifiers and the signal processing sections for the left and right regions. Consequently, the image data 150 which have high quality can be outputted.

With the configuration of the image pickup apparatus, discontinuity appearing on the boundary between image pickup regions can be eliminated irrespective of a temperature characteristic of CCD output amplifiers, a numerical aperture of the lens, and gain setting of CDS/GIN/AD sections.

Figure 9:
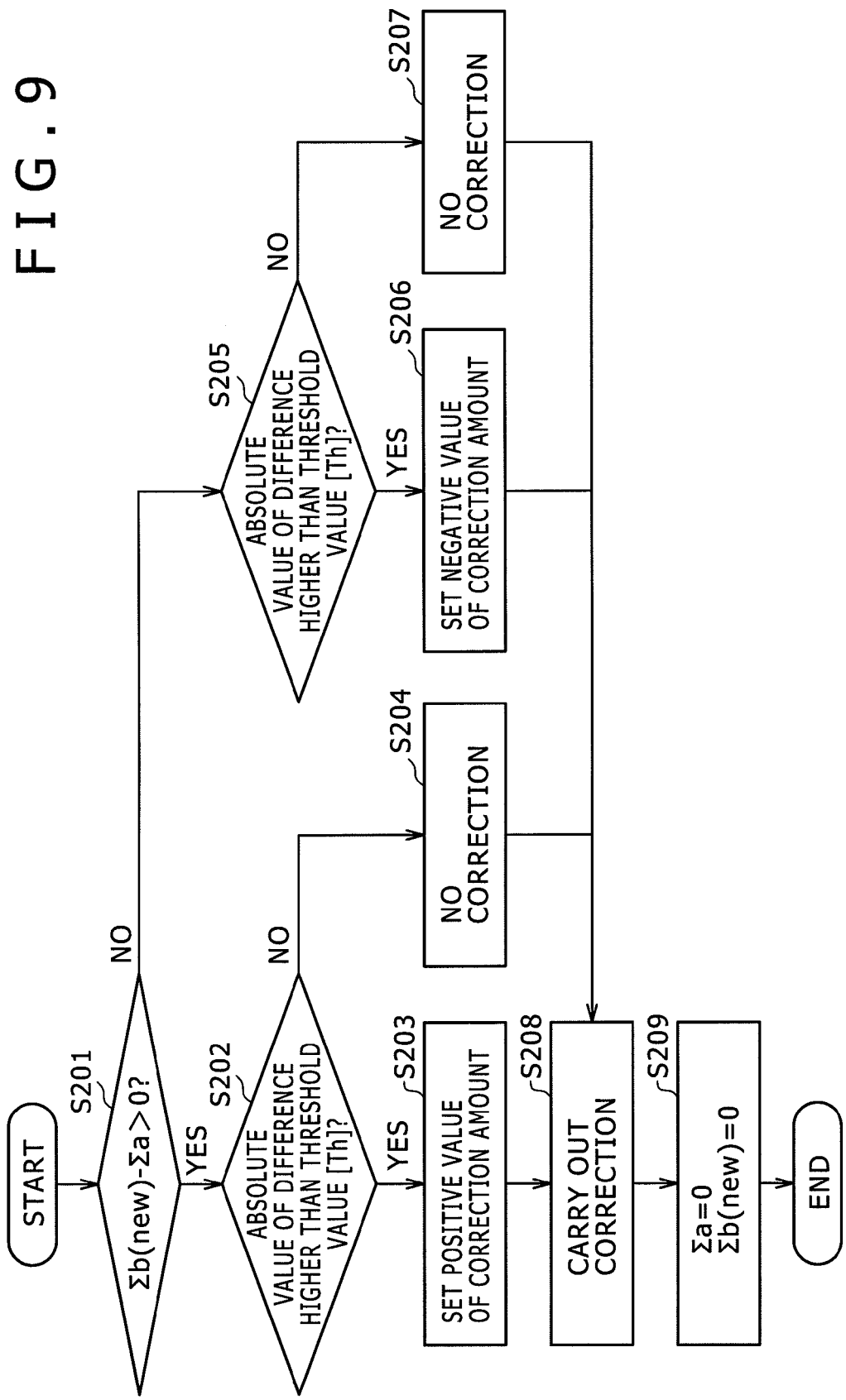
FIG. 9 is a flow chart illustrating an image correction processing sequence to which the present embodiment is applied.

An image correction processing sequence of the image pickup apparatus is described with reference to a flow chart of FIG. 9. The process of the flow chart shown in FIG. 9 illustrates processes of the correction section 121 and the calculation section 122 of the configuration shown in FIG. 3. First, after image data in the overall area of one screen are inputted to the correction section 121 and the calculation section 122, the calculation section 122 calculates, based on pixel values of the pixels on the boundary between the divisional region images, the two pixel value sum totals including (a) the pixel value sum total of the pixels a1 to aN: Σa=La1+La2+ . . . LaN, and (b) the correction pixel value sum total of partly replaced pixel values of the pixels b1 to bN: Σb(new)=Lb1(new)+Lb2(new)+ . . . +LbN(new)

Figure 7:
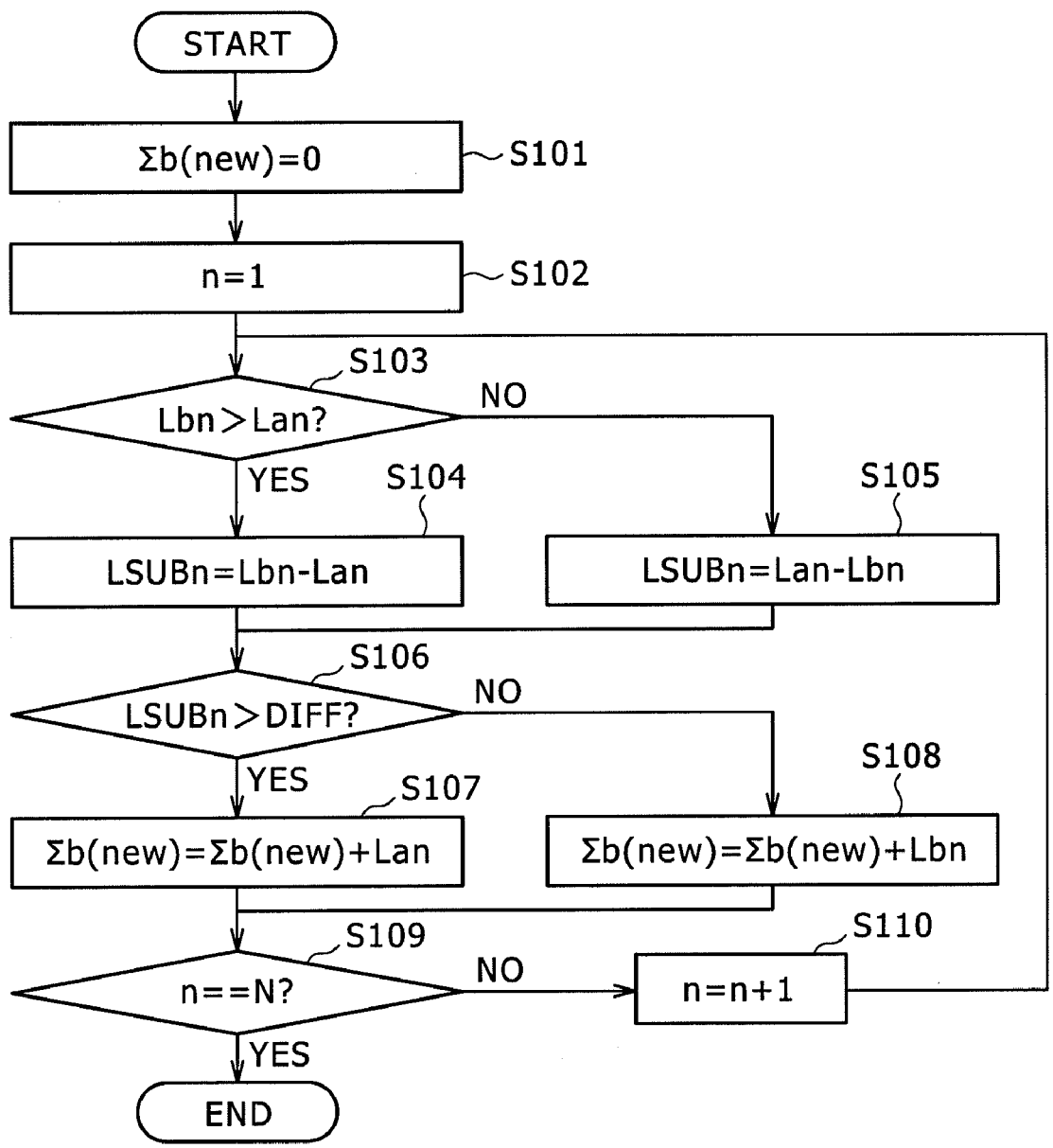
FIG. 7 is a flow chart illustrating a calculation processing sequence of a correction pixel value sum total.

The calculation process of the correction pixel value sum total difference [SUB(new)] is executed in accordance with the flow described hereinabove with reference to FIG. 7. The calculation section 122 further calculates, based on the pixel value sum total [Σa] of the pixels a1 to aN and the correction pixel value sum total [Σb(new)], the correction pixel value sum total difference $[SUB(\text{new})=\Sigma b(\text{new})-\Sigma a]$ Then, the calculation section 122 inputs the calculated correction pixel value sum total difference [SUB(new)=Σb(new)−Σa] to the correction section 121.

The correction section 121 receives the correction pixel value sum total difference [SUB(new)=Σb(new)−Σa] from the calculation section 122 and executes an image correction process in accordance with the flow chart shown in FIG. 9. Referring to FIG. 9, the correction section 121 first decides at step S201 whether or not the correction pixel value sum total difference [SUB(new)=Σb(new)−Σa] is greater than 0.

It is to be noted here that Σa and Σb(new) respectively are (a) the pixel value sum total of the pixels a1 to aN: Σa=La1+La2+ . . . LaN, and (b) the correction pixel value sum total of partly replaced pixel values of the pixels b1 to bN: Σb(new)=Lb1(new)+Lb2(new)+ . . . +LbN(new)

If it is decided at step S201 that the correction pixel value sum total difference [SUB(new)=Σb(new)−Σa] has a positive value higher than 0, then the processing advances to step S202. At step S202, the correction section 121 decides whether or not the absolute value |SUB(new)| of the correction pixel value sum total difference [SUB(new)=Σb(new)−Σa] is higher than the preset threshold value [Th].

If the absolute value |SUB(new)| of the correction pixel value sum total difference [SUB(new)=Σb(new)−Σa] is higher than the preset threshold value [Th], then the processing advances to step S203, at which the correction section 121 sets a positive value (+) as a correction amount. In particular, the correction section 121 carries out setting of a correction amount for raising the level or luminance of the left region image which is a correction object image region. This is a setting process for a correction amount corresponding to the setting of (1) where the absolute value |SUB(new)| of the correction pixel value sum total difference [SUB(new)=Σb(new)−Σa] is greater than the threshold value [Th], correction of adding an offset amount to the left region image (plus correction) is carried out in order to raise the output level of the left region image from among the correction modes (1) to (4) described hereinabove.

On the other hand, if it is decided at step S202 that the absolute value |SUB(new)| of the correction pixel value sum total difference [SUB(new)=Σb(new)−Σa] is not greater than the preset threshold value [Th], then the processing advances to step S204, at which the correction section 121 sets that no correction should be carried out. This is a setting process corresponding to the setting of (2) where the correction pixel value sum total difference [SUB(new)=Σb(new)−Σa] is lower than the threshold value [Th] and is not a negative value, no correction is carried out from among the correction modes (1) to (4) described hereinabove.

On the other hand, if it is decided at step S201 that the correction pixel value sum total difference [SUB(new)=Σb(new)−Σa] is equal to or smaller than 0, then the processing advances to step S205. At step S205, it is decided whether or not the absolute value |SUB(new)| of the correction pixel value sum total difference [SUB(new)=Σb(new)−Σa] is higher than the preset threshold value [Th].

If the absolute value |SUB(new)| of the correction pixel value sum total difference [SUB(new)=Σb(new)−Σa] is higher than the preset threshold value [Th], then the processing advances to step S206, at which a negative value (−) is set as a correction amount. In particular, setting of a correction amount for lowering the level or luminance of the left region image which is a correction object image region is carried out. This is a setting process corresponding to the setting of (3) where the correction pixel value sum total difference [SUB(new)=Σb(new)−Σa] is a negative value and the absolute value |SUB(new)| of the correction pixel value sum total difference [SUB(new)] is higher than the threshold value [Th], correction of subtracting an offset amount from the left region image (minus correction) is carried out in order to lower the output level of the left region image; or from among the correction modes (1) to (4) described hereinabove.

On the other hand, if it is decided at step S205 that the absolute value |SUB(new)| of the correction pixel value sum total difference [SUB(new)=Σb(new)−Σa] is not higher than the preset threshold value [Th], then the processing advances to step S207. At step S207, the calculation section 122 sets so that no correction should be carried out. This is a setting process corresponding to the setting of (4) where the correction pixel value sum total difference [SUB(new)=Σb(new)−Σa] is a negative value and the absolute value |SUB(new)| of the correction pixel value sum total difference [SUB(new)=Σb(new)−Σa] is equal to or smaller than the threshold value [Th], no correction is carried out from among the correction modes (1) to (4) described hereinabove.

In this manner, one of the correction modes is determined at steps S204 to S207, and correction in accordance with the determined correction mode is executed at step S208. In particular, at step S208, one of the following four patterns including (1) where the correction pixel value sum total difference [SUB(new)=Σb(new)−Σa] is equal to or greater than the threshold value [Th], correction of adding an offset amount to the left region image (plus correction) is carried out in order to raise the output level of the left region image;

(2) where the correction pixel value sum total difference [SUB(new)=Σb(new)−Σa] is lower than the threshold value [Th] and is not a negative value, no correction is carried out;

(3) where the correction pixel value sum total difference [SUB(new)=Σb(new)−Σa] is a negative value and the absolute value |SUB(new)| of the correction pixel value sum total difference [SUB(new)] is higher than the threshold value [Th], correction of subtracting an offset amount from the left region image (minus correction) is carried out in order to lower the output level of the left region image; and (4) where the correction pixel value sum total difference [SUB(new)=Σb(new)−Σa] is a negative value and the absolute value |SUB(new)| of the correction pixel value sum total difference [SUB(new)] is equal to or smaller than the threshold value [Th], no correction is carried out is selectively executed.

Thereafter, at step S209, the calculation section 122 executes a reset process for the pixel value sum total value [Σa] and the correction pixel value sum total [Σb], whereafter the process is ended. The operations of the flow shown in FIG. 9 are executed repetitively for the image inputted to the correction section 121 for every processing timing set in advance, for example, for every image frame.

It is to be noted that the correction amount in correction executed for each image is not a value corresponding to the difference value but is approximately 0.1% as described hereinabove. For example, if the luminance level of the digital signal is represented by 12 bits (0 (min) to 4,095 (max)), then adjustment is carried out within a range of $$4{,}095 \times 0.1\% = 4$$

that is, adjustment of the level or luminance is carried out within the luminance level of −4 to +4 for pixels of one image. By this adjustment process, correction with oscillation suppressed can be anticipated.

[Processing Example Ready for a Color Image]

Figure 10:
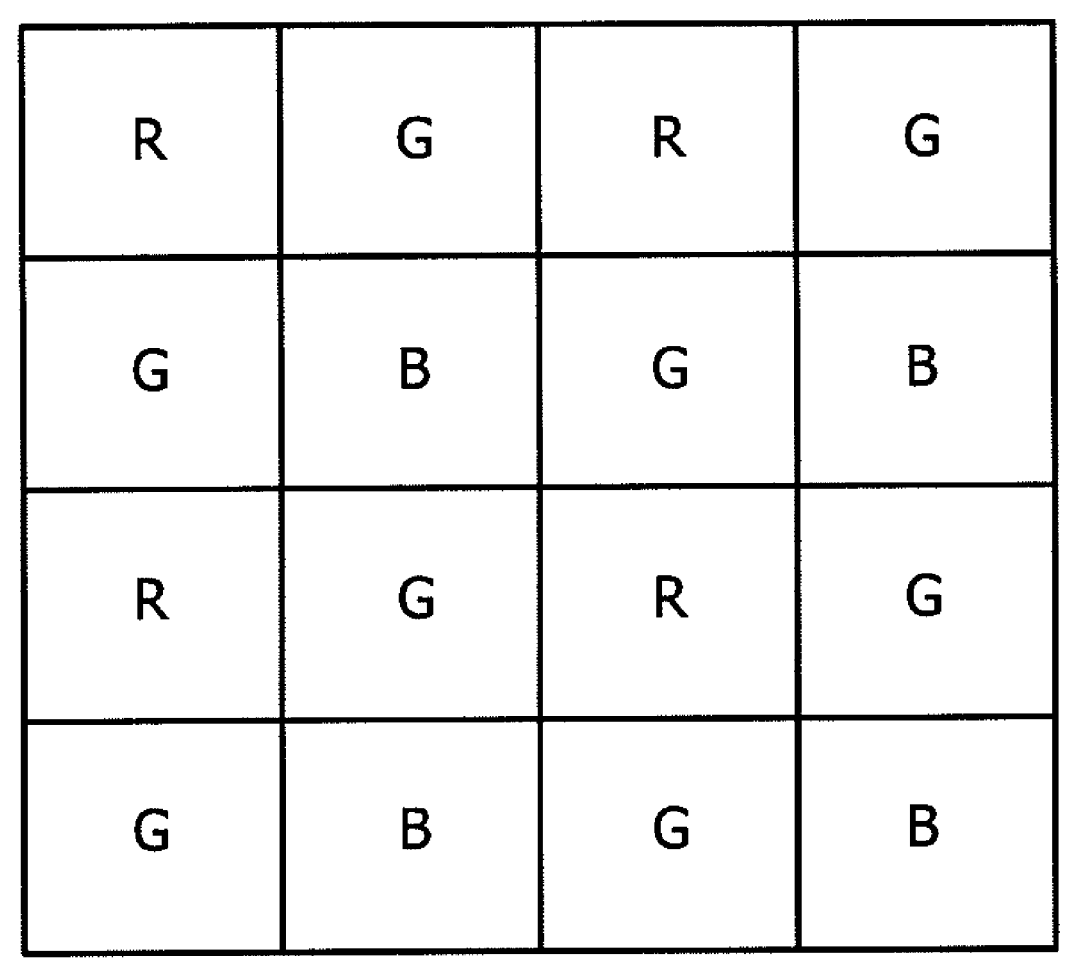

While the processing example described above is applied to a monochromatic image whose pixels basically have only luminance data, according to the present embodiment, the correction process in accordance with the sequence described above can be applied also to a color image. In the following, a processing example for an image pickup by a Bayer array color CCD unit is described with reference to FIGS. 10 to 12. The Bayer array color CCD unit has a pattern which includes repetitions of two lines including a line including a repetition pattern of [R] and [G] and another line including another repetition pattern of [G] and [B]

like

R G R G R G . . . and

G B G B G B . . . .

Also where a CCD unit has such a Bayer array image as described above, if the CCD unit is of the type wherein it is divided into two left and right regions, then a difference sometimes occurs between the pixel value levels of left and right color images and makes the images different from each other not only in luminance but also in color tone. Where the process according to the present embodiment is applied, then an image formed from left and right images which are well balanced with each other and the boundary between which is not conspicuous can be produced.

Figure 11:
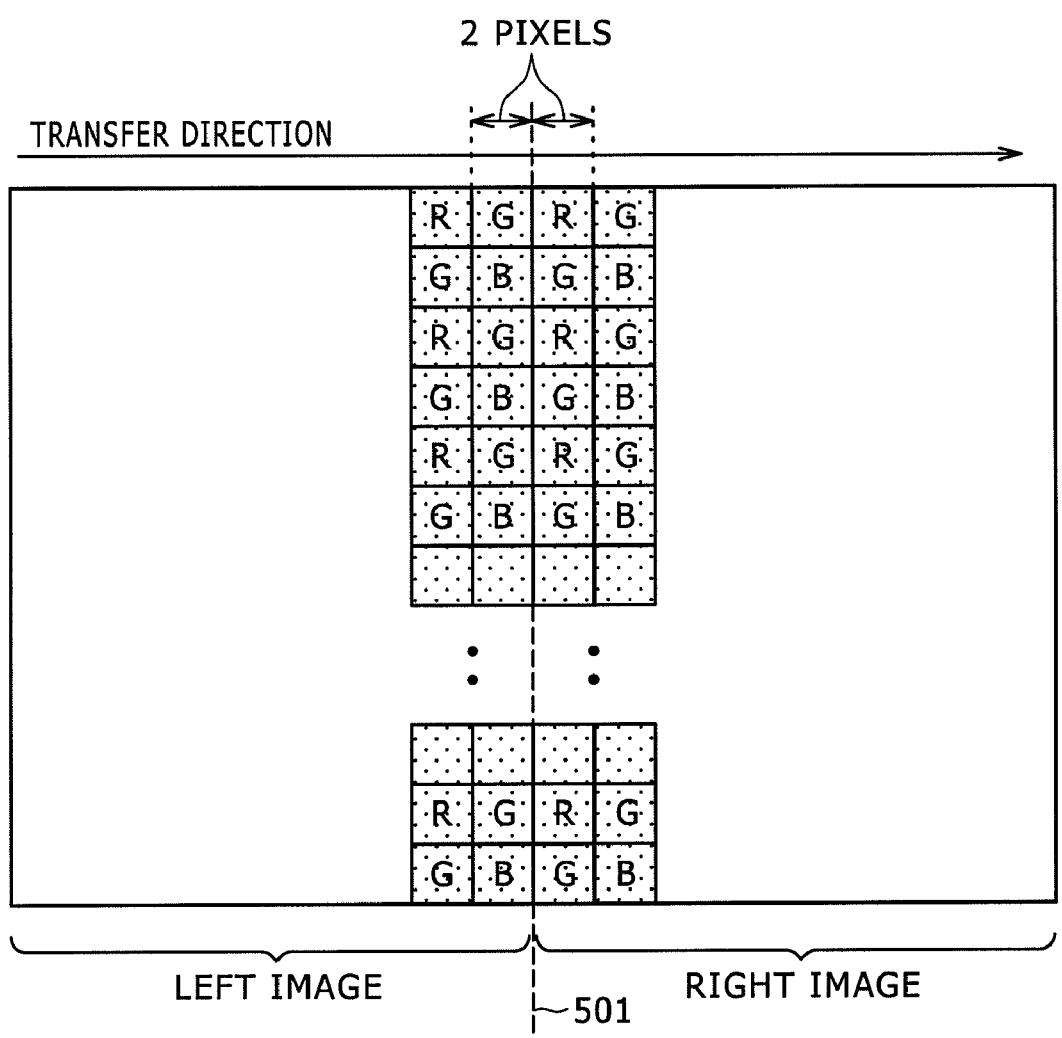
FIGS. 11 and 12 are diagrammatic views illustrating an example of an image correction process for a color image.

A display image originating from an image picked up by a two-part CCD unit having a Bayer array has such a configuration as shown in FIG. 11, and a left image and a right image having a boundary 501 therebetween are sometimes different in luminance or color tone. Where the process in accordance with the present embodiment is carried out, two pixels are selected from within the left image and the right image adjacent the boundary 501 and applied to calculate a correction pixel value [Σb(new)] based on a pixel value comparison process similar to that described hereinabove. Further, the two pixels are applied to calculate a correction pixel value sum total difference [SUB(new)].

If only one pixel of each of the left image and the right image is acquired, then combinations of different pixel data like G and R,
B and G, and
G and R appear in order from the first line. Each of the combinations includes pixel data whose levels are originally different from each other. Therefore, two pixels on the boundary of each of the left image and the right image are acquired. By this process, each of combinations of pixel data includes same pixel data in the left and right images like R G and R G,
G B and G B, and
R G and R G in order from the first line. Thus, pixel level adjustment is carried out based on the sets of such two pixels.

Figure 12:
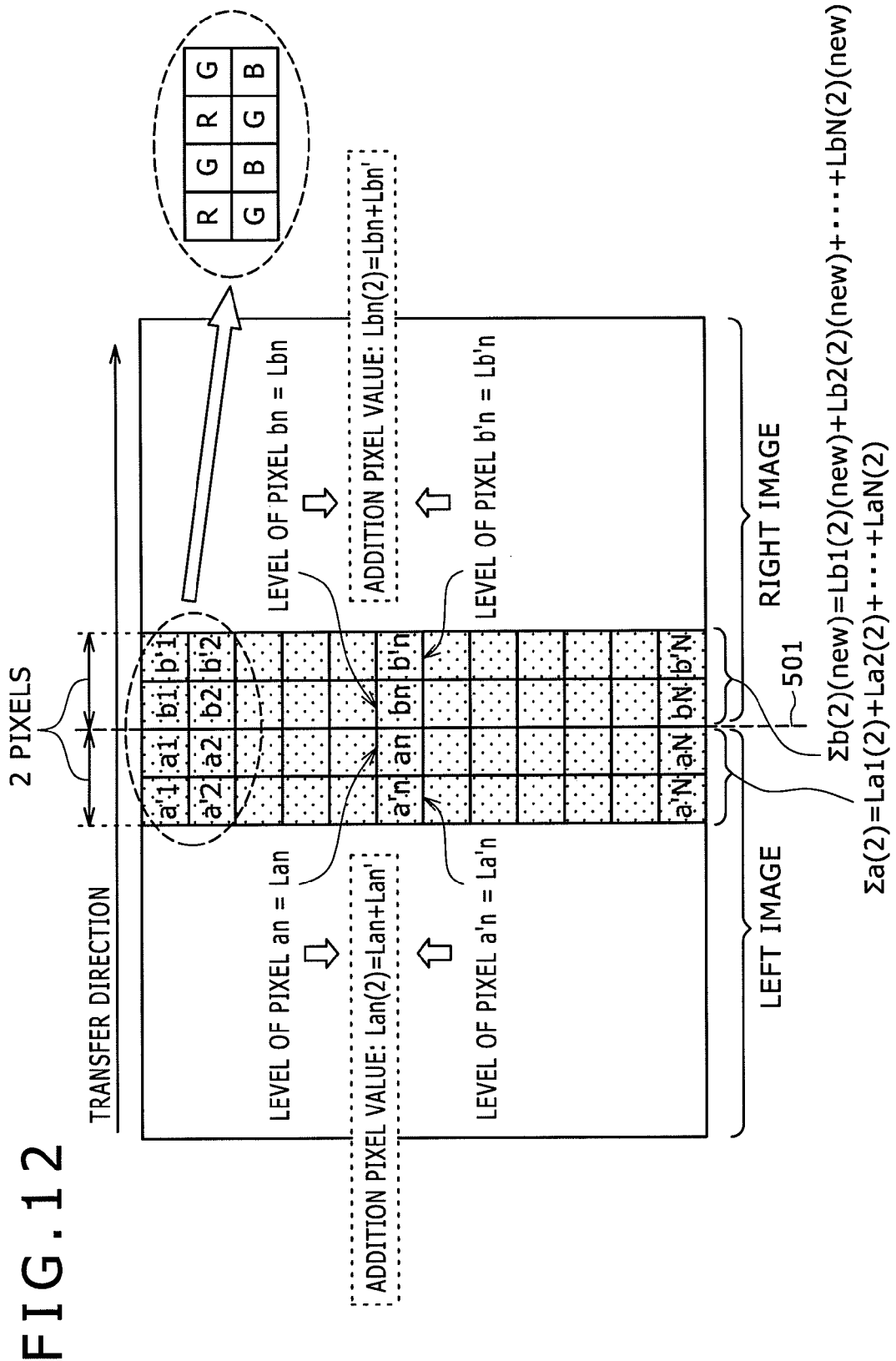

A particular processing example is described with reference to FIG. 12. The calculation section 122 shown in FIG. 3 first adds the levels [Lan] and [Lan'] of two pixels [an] and [an'] of the left image adjacent the boundary 501 to calculate a sum pixel values [Lan(2)]. In particular, the sum pixel values [Lan(2)] is calculated in accordance with the following expression:

$$Lan(2)=Lan+Lan'$$

Similarly, the calculation section 122 adds the levels [Lbn] and [Lbn'] of the right image adjacent the boundary 501 to calculate a sum pixel values [Lbn(2)]. In particular, the sum pixel values [Lbn(2)] is calculated in accordance with the following expression:

$$Lbn(2)=Lbn+Lbn'$$

Figure 3:
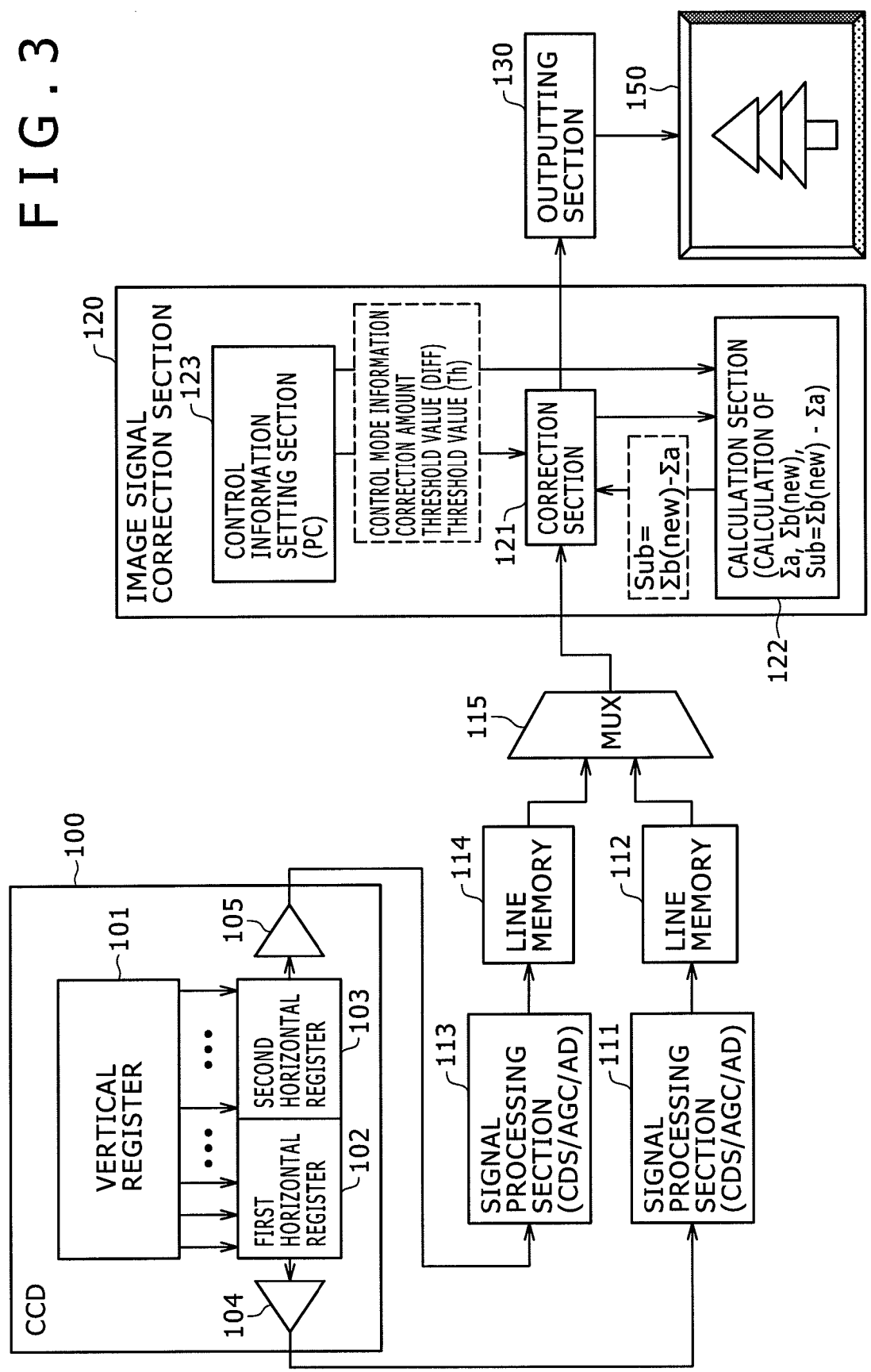
FIG. 3 is an example of a configuration of an image pickup apparatus and an image signal processing apparatus to which the present embodiment is applied.

Then, the calculation section 122 shown in FIG. 3 calculates, for each of the lines, a difference absolute value of the sum pixel value of two pixels adjacent the boundary. Where the sum pixel value difference absolute value of the line n is represented by [LSUBn(2)], $$LSUBn(2)=|Lbn(2)-Lan(2)|$$

is calculated.

Then, the calculation section 122 carries out comparison between the sum pixel value difference absolute value [LSUBn(2)] calculated for each of the first to Nth lines and a difference threshold value [DIFF(2)] set in advance.

If the sum pixel value difference absolute value [LSUBn(2)] is higher than the difference threshold value [DIFF(2)], that is, if the expression $$LSUBn(2)>DIFF(2)$$

is satisfied, then the calculation section 122 decides that the correlation between the two pixels [an]and [an'] and the two pixels [bn] and [bn'] of the left and right images contiguous to each other on the boundary is low.

The sum pixel values [Lbn(2)] in one of the image regions on the line with regard to which it is decided that the correlation is low in this manner, in the present example, in the right side image region, is set as a correction sum pixel value, that is, as $$[Lbn(2)(new)]=[Lan(2)]$$

On the other hand, if the sum pixel value difference absolute value [LSUBn(2)] is not higher than the difference threshold value [DIFF(2)], that is, if the expression $$LSUBn(2)>DIFF(2)$$

is not satisfied, then the calculation section 122 decides that the correlation between the two pixels [an] and [an'] and the two pixels [bn] and [bn'] of the left and right images contiguous to each other on the boundary is high. Thus, the calculation section 122 sets the correction sum pixel value [Lbn(2)(new)] as $$[Lbn(2)(new)]=[Lbn(2)]$$

The calculation section 122 carries out such a pixel value replacement process as described above to calculate the two pixel value sum totals including (a) the sum pixel value sum total of the sum pixel values [Lan(2)] each of which is a sum of the levels [Lan] and [Lan'] of two pixels [an] and [an'] of the left image adjacent the boundary 501 over the first to last Nth lines, and (b) the correction sum pixel value sum total of the sum pixel values [Lbn(2)] which are partly replaced and each of which is a sum of the levels [Lbn] and [Lbn'] of two pixels [bn] and [bn'] of the right image adjacent the boundary 501 over the first to last Nth lines.

It is to be noted that the preset difference threshold value [DIFF(2)] can be set, for example, from an external PC as the control information setting section 123. For example, where the pixel values of the pixels can be set among pixel value levels from 0 to 255 using 8 bits, the difference threshold value [DIFF(2)] can be set to one of the values from 0 to 511 which define a range from a minimum value to a maximum value of the difference for two pixels. As a particular example, where the pixel values of the pixels can be set among pixel value levels from 0 to 255 using 8 bits, the difference threshold value [DIFF] is set, for example, to [DIFF(2)]=64.

Now, processing of the correction section 121 is described. The correction section 121 executes image correction for reducing the discontinuity of left and right image regions. In the image process of the image signal processing method of the present embodiment, as a process for reducing the discontinuity of the left and right image regions, the following process is carried out. In particular, correction for minimizing the correction sum pixel value sum total difference [SUB(2)(new)] given by $$SUB(2)(new)=\Sigma b(2)(new)-\Sigma a(2)$$

which is a difference between the two sum pixel value sum totals calculated by the process described hereinabove and including $$\Sigma a(2)=La1(2)+La2(2)+\ldots LaN(2) \quad (a)$$

$$\Sigma b(2)(new)=Lb1(2)(new)+Lb2(2)(new)+\ldots +LbN(2)(new) \quad (b)$$

The correction section 121 carries out the process for the image frame based on the correction sum pixel value sum total difference [SUB(2)(new)] calculated based on certain one image data.

It is to be noted that the processing may be carried out by any of two processing modes including (1) a processing mode wherein the correction sum pixel value sum total difference [SUB(2)(new)] is calculated in a unit of a frame and image correction based on the calculated data is carried out in a unit of a frame, and (2) another processing mode wherein one frame image is utilized to calculate the correction sum pixel value sum total difference [SUB(2)(new)] and image correction based on the calculated data is carried out for the frame and a plurality of succeeding frames.

The image correction process executed by the correction section 121 is similar to that described hereinabove with reference to the flow of FIG. 9. In particular, the correction section 121 compares the correction sum pixel value sum total difference [SUB(2) (new)=$\Sigma b(2)$ (new)-$\Sigma a(2)$] with a threshold value [Th] set in advance and selectively executes one of the following processes in response to a result of the process. In particular, (1) where the correction sum pixel value sum total difference [SUB(2)(new)=Σb(2)(new)−Σa(2)] is equal to or greater than the threshold value [Th], correction of adding an offset amount to the left region image (plus correction) is carried out in order to raise the output level of the left region image;

(2) where the correction sum pixel value sum total difference [SUB(2)(new)=Σb(2)(new)−Σa(2)] is lower than the threshold value [Th] and is not a negative value, no correction is carried out;

(3) where the correction sum pixel value sum total difference [SUB(2) (new)=Σb(2) (new)−Σa(2)] is a negative value and the absolute value |SUB(2)(new)| of the correction sum pixel value sum total difference [SUB(2)(new)] is higher than the threshold value [Th], correction of subtracting an offset amount from the left region image (minus correction) is carried out in order to lower the output level of the left region image; or (4) where the correction sum pixel value sum total difference [SUB(2) (new)=Σb(2) (new)−Σa(2)] is a negative value and the absolute value |SUB(new)| of the correction sum pixel value sum total difference [SUB(2)(new)] is equal to or smaller than the threshold value [Th], no correction is carried out.

In short, one of the four patterns (1) to (4) described is carried out based on a result of the comparison between the correction sum pixel value sum total difference [SUB(2)(new)=Σb(2)(new)−Σa(2)] and the preset threshold value [Th].

It is to be noted that the threshold value [Th] and the correction mode information (1) to (4) described above can be inputted from the control information setting section 123 such as, for example, a PC. Further, a memory for storing the threshold value [Th] and the correction mode information (1) to (4) may be set in the correction section 121 such that the recoded information is applied. The correction mode information includes a correction amount or offset amount. it is to be noted that an oscillation phenomenon can be avoided by carrying out a process of applying correction for an image moderately little by little similarly as in the process described hereinabove.

The present invention has been described in detail with reference to the particular embodiment thereof. However, it is apparent that one skilled in the art can modify or alter the embodiment without departing from the subject matter of the present invention. In particular, the present invention has been disclosed in the form of illustration, and the substance described in the present specification shall not be interpreted restrictively. In order to decide the subject matter of the present invention, the claim should be referred to.

Further, the series of processes described above can be executed by hardware, by software or by a composite configuration of hardware and software. Where the series of processes is executed by software, a program which describes the processing sequence can be installed into a memory in a computer incorporated in hardware for exclusive use so as to be executed by the computer or can be installed into a general-purpose computer which can execute various processes so as to be executed by the computer. For example, the program can be recorded in advance on a recording medium. It is possible not only to install the program from a recording medium into a computer but also to receive the program through a network such as a LAN (Local Area Network) or the Internet and install the program into a recording medium such as a built-in hard disk.

It is to be noted that the various processes described herein may be but need not necessarily be processed in a time series in the order as described and may be executed in parallel or individually depending upon the processing capacity of the apparatus which executes the processes or as occasion demands. Further, in the present specification, the term "system" is used to represent a logical set configuration composed of a plurality of apparatus which may not necessarily be accommodated in the same housing.

In summary, with the configuration of the embodiment described above, where output signals corresponding to divisional regions of an image pickup device are inputted to execute a correction process therefor, the pixel values of boundary pixels including pixels in pixel columns positioned adjacent the boundary between the first and second image regions corresponding to the divisional regions of the image pickup device and including at least one pixel for each of lines are acquired. Then, the first pixel value sum total which is a sum value of pixel values of the boundary pixels in the first image region on the lines is calculated. Further, if the difference between the pixel value of a pixel in the pixel column in the second image region on any of the lines and the pixel value of the corresponding pixel in the pixel column in the first image region on the same line is greater than a preset threshold value, then the pixel value of the pixel in the second image region is replaced with the pixel value of the pixel in the first image region. Then, the correction second pixel value sum total which is a sum value of the partially replaced pixel values, that is, the pixel values including those after such replacement, of the boundary pixels in the second image region on the lines is calculated. Thereafter, comparison of the correction pixel value sum total difference which is a difference value between the first pixel value sum total and the correction second pixel value sum total with the preset threshold value is executed. Then, the correction process for the divisional region images is executed in a correction mode which is determined in response to a result of the comparison. In particular, if the absolute value of the difference value is higher than the threshold value, then the process of changing the pixel values of the divisional region images is executed. With the configuration described, pixel value correction, that is, correction of eliminating discontinuity in the divisional image regions, can be carried out efficiently without executing such a process as correlation detection of the divisional regions.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing circuit for executing signal processing for an output of an image pickup device, comprising:

an image signal correction section configured to receive output signals corresponding to divisional regions of the image pickup device as inputs and execute a correction process for the received signals;

said image signal correction section including a calculation section configured to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total, and a correction section configured to execute comparison between the correction pixel value sum total difference calculated by said calculation section and a threshold value determined in advance, decide a correction mode for divisional region images in response to a result of the comparison and execute a pixel value correction process for the divisional region images in accordance with the decided correction mode, said calculation section carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

2. The image signal processing circuit according to claim 1, wherein said image signal correction section is configured to execute an image correction process for a monochromatic image, and acquires pixel values of a pixel column in each of the first and second image regions including, in each of the lines, one pixel adjacent the boundary between the first and second image regions individually corresponding to the divisional regions of the image pickup device and executes a process of calculating the first pixel value sum total which is a sum value of pixel values of those of the pixels in the pixel column in the first image region each of which is adjacent the boundary in one of the lines and the correction second pixel value sum total which is a sum value of partly replaced pixel values of those of the pixels in the pixel column in the second image region each of which is positioned adjacent the boundary in one of the lines.

3. The image signal processing circuit according to claim 1, wherein said image signal correction section is configured to execute an image correction process for a color image, and acquires pixel values of a pixel column in each of the first and second image regions including, in each of the lines, a plurality of pixels adjacent the boundary between the first and second image regions individually corresponding to the divisional regions of the image pickup device and executes a process of calculating the first pixel value sum total which is a sum value of pixel values of those of the pixels in the pixel columns in the first image region each of which is adjacent the boundary in one of the lines and the correction second pixel value sum total which is a sum value of partly replaced pixel values of those of the pixels in the pixel columns in the second image region each of which is positioned adjacent the boundary in one of the lines.

4. The image signal processing circuit according to claim 1, further comprising:

a plurality of output amplifiers configured to output voltage information based on charge information corresponding to the divisional regions of said image pickup device;

a plurality of signal processing sections configured to individually receive the outputs of said output amplifiers as inputs to produce digital signals; and a multiplexer configured to multiplex outputs of said signal processing sections;

said calculation section receiving the digital image signal from said multiplexer to execute calculation of the correction pixel value sum total difference, said correction section receiving the digital image signal from said multiplexer to execute the pixel value correction process.

5. The image signal processing circuit according to claim 1, wherein, where the absolute value of the correction pixel value sum total difference is higher than the preset threshold value, said correction section executes the pixel value correction process for changing the pixel value of the divisional region image, but, where the absolute value of the correction pixel value sum total difference is equal to or lower than the preset threshold value, the correction section does not execute the correction process.

6. The image signal processing circuit according to claim 1, wherein said correction section compares the correction pixel value sum total difference with the preset threshold value and selectively executes, where said first pixel value sum total is represented by $\Sigma a$ and said second pixel value sum total is represented by $\Sigma b$, in response to a result of the comparison, one of four operation patterns including:

(1) an operation pattern in which, where the correction pixel value sum total difference is equal to or greater than the threshold value, correction for raising the output level of the first image region is carried out;

(2) another operation pattern in which, where the correction pixel value sum total difference is lower than the threshold value and is not a negative value, no correction is carried out;

(3) a further operation mode in which, where the correction pixel value sum total difference is a negative value and the absolute value of the correction pixel value sum total difference is higher than the threshold value, correction for lowering the output level of the first image region; and (4) a still further operation mode in which, where the correction pixel value sum total difference is a negative value and the absolute value of the correction pixel value sum total difference is equal to or smaller than the threshold value, no correction is carried out.

7. The image signal processing circuit according to claim 1, wherein said correction section sets a correction amount including an absolute value smaller than an absolute value of the correction pixel value sum total difference to execute the correction process for each image frame.

8. An image pickup apparatus, comprising:

an image pickup section; and an image signal processing section configured to execute a signal process for an image signal from said image pickup section;

said image pickup section including a configuration for outputting an output signal corresponding to each of divisional regions of an image pickup device, said image signal processing section including an image signal correction section configured to receive output signals corresponding to divisional regions of the image pickup device as inputs and execute a correction process for the received signals, said image signal correction section including a calculation section configured to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total, and a correction section configured to execute comparison between the correction pixel value sum total difference calculated by said calculation section and a threshold value determined in advance, decide a correction mode for divisional region images in response to a result of the comparison and execute a pixel value correction process for the divisional region images in accordance with the decided correction mode, said calculation section carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

9. An image signal processing method executed by an image signal processing apparatus for executing signal processing for an output of an image pickup device, comprising:

an image signal correction step, executed by an image signal correction section of the image signal processing apparatus, of receiving output signals corresponding to divisional regions of the image pickup device as inputs to the image signal correction section and executing a correction process for the received signals;

the image signal correction step including a calculation step, executed by a calculation section of the image signal correction section, of acquiring pixel values of boundary pixels including pixels positioned adjacent the boundary between first and second image regions corresponding to the divisional regions of the image pickup device, calculating a first pixel value sum total which is a sum value of pixel values of the boundary pixels in the first image region on lines and a correction second pixel value sum total which is a sum value of partly replaced pixel values of the boundary pixels in the second image region on the lines, and calculating a correction pixel value sum total difference which is a difference value between the first pixel value sum total and the correction second pixel value sum total, and a correction step, executed by a correction section of the image signal correction section, of executing comparison between the correction pixel value sum total difference calculated by the calculation section and a threshold value determined in advance, deciding a correction mode for divisional region images in response to a result of the comparison and executing a pixel value correction process for the divisional region images in accordance with the decided correction mode, the calculation step being a step of carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

10. A computer program stored in a non-transitory computer readable medium for causing an image signal processing apparatus to execute signal processing for an output of an image pickup device, comprising:

an image correction step of causing an image signal correction section of the image signal processing apparatus to receive output signals corresponding to divisional regions of the image pickup device as inputs to the image signal correction section and execute a correction process for the received signals;

the image signal correction step including a calculation step of causing a calculation section of the image signal correction section to acquire pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total, and a correction step of causing a correction section of the image signal correction section to execute comparison between the correction pixel value sum total difference calculated by the calculation section and a threshold value determined in advance, decide a correction mode for divisional region images in response to a result of the comparison and execute a pixel value correction process for the divisional region images in accordance with the decided correction mode, the calculation step being a step of carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

11. An image signal processing circuit for executing signal processing for an output of an image pickup device, comprising:

image signal correction means for receiving output signals corresponding to divisional regions of the image pickup device as inputs and execute a correction process for the received signals;

said image signal correction means including calculation means for acquiring pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total, and correction means for executing comparison between the correction pixel value sum total difference calculated by said calculation means and a threshold value determined in advance, decide a correction mode for divisional region images in response to a result of the comparison and execute a pixel value correction process for the divisional region images in accordance with the decided correction mode, said calculation means carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

12. An image pickup apparatus, comprising:

image pickup means; and image signal processing means for executing a signal process for an image signal from said image pickup means;

said image pickup means including a configuration for outputting an output signal corresponding to each of divisional regions of an image pickup device, said image signal processing means including image signal correction means for receiving output signals corresponding to divisional regions of the image pickup device as inputs and execute a correction process for the received signals, said image signal correction means including calculation means for acquiring pixel values of boundary pixels including pixels positioned adjacent the boundary between first and second image regions corresponding to the divisional regions of the image pickup device, calculate a first pixel value sum total which is a sum value of pixel values of the boundary pixels in the first image region on lines and a correction second pixel value sum total which is a sum value of partly replaced pixel values of the boundary pixels in the second image region on the lines and calculate a correction pixel value sum total difference which is a difference value between the first pixel value sum total and the correction second pixel value sum total, and correction means for executing comparison between the correction pixel value sum total difference calculated by said calculation means and a threshold value determined in advance, decide a correction mode for divisional region images in response to a result of the comparison and execute a pixel value correction process for the divisional region images in accordance with the decided correction mode, said calculation means carrying out the calculation process of the correction second pixel value sum total such that difference calculation between a boundary pixel value of a boundary pixel in the second image region and a boundary pixel value of a boundary pixel in the first image region is carried out in a unit of one line and, where the calculated pixel value difference is higher than a preset threshold value, the pixel value of the boundary pixel in the second image region is rewritten with the pixel value of the boundary pixel in the first image region.

* * * * *